(12) United States Patent
Anderson et al.

(10) Patent No.: US 10,359,075 B2
(45) Date of Patent: Jul. 23, 2019

(54) SYSTEM AND METHOD FOR HYDROSTATIC BEARINGS

(71) Applicant: Energy Recovery, Inc., San Leandro, CA (US)

(72) Inventors: David Deloyd Anderson, Castro Valley, CA (US); Chinmay Vishwas Deshpande, Fremont, CA (US)

(73) Assignee: Energy Recovery, Inc., San Leandro, CA (US)

( * ) Notice: Subject to any disclaimer, the term of this patent is extended or adjusted under 35 U.S.C. 154(b) by 609 days.

(21) Appl. No.: 14/943,318

(22) Filed: Nov. 17, 2015

(65) Prior Publication Data
US 2016/0138649 A1    May 19, 2016

Related U.S. Application Data

(60) Provisional application No. 62/081,470, filed on Nov. 18, 2014, provisional application No. 62/088,333, filed on Dec. 5, 2014.

(51) Int. Cl.
*E21B 43/16* (2006.01)
*E21B 43/26* (2006.01)
(Continued)

(52) U.S. Cl.
CPC .......... *F16C 32/0644* (2013.01); *E21B 43/16* (2013.01); *E21B 43/26* (2013.01);
(Continued)

(58) Field of Classification Search
CPC ....... F04F 13/00; F16C 32/06; F16C 32/0644; F16C 32/0692; F16C 32/0696;
(Continued)

(56) References Cited

U.S. PATENT DOCUMENTS 2,800,120 A * 7/1957 Boszormenyi .......... F02B 33/42
123/559.2
3,895,689 A * 7/1975 Swearingen .......... F01D 25/168
184/6.4
(Continued)

FOREIGN PATENT DOCUMENTS

EP          1719920 A1    11/2006
WO       96/17176 A1     6/1996
WO    2014/172576 A1    10/2014

OTHER PUBLICATIONS

PCT International Search Report & Written Opinion; Application No. PCT/US2015/061136; dated Feb. 23, 2016; 13 pages.

*Primary Examiner* — Philip E Stimpert
(74) *Attorney, Agent, or Firm* — Fletcher Yoder, P.C.

(57) ABSTRACT

A system, includes a hydraulic transfer system configured to exchange pressures between a first fluid and a second fluid, wherein the first fluid has a pressure higher than the second fluid, comprising: a sleeve; a cylindrical rotor disposed within the sleeve in a concentric arrangement and has a first end face and a second end face disposed opposite each other; a first end cover having a first surface that interfaces with the first end face of the cylindrical rotor; a second end cover having a second surface that interfaces with the second end face of the cylindrical rotor; and a hydrostatic bearing system configured to utilize a bearing fluid at a pressure higher than the second fluid to resist axial displacement, radial displacement, or both axial and radial displacement of the cylindrical rotor.

13 Claims, 14 Drawing Sheets

(51) Int. Cl.
    *F04F 13/00*     (2009.01)
    *F16C 32/06*     (2006.01)
    *E21B 43/267*     (2006.01)

(52) U.S. Cl.
    CPC ............ *E21B 43/267* (2013.01); *F04F 13/00* (2013.01); *F16C 32/06* (2013.01)

(58) Field of Classification Search
    CPC ........ F16C 32/064; E21B 43/16; E21B 43/26; E21B 43/267
    See application file for complete search history.

(56) References Cited

U.S. PATENT DOCUMENTS

| | | | |
|---|---|---|---|
| 3,966,279 | A | 6/1976 | Raimondi |
| 5,988,993 | A * | 11/1999 | Hauge ........................ 417/365 |
| 8,075,281 | B2 | 12/2011 | Martin et al. |
| 2006/0245909 | A1 * | 11/2006 | Stover .............................. 415/1 |
| 2010/0014997 | A1 | 1/2010 | Ruiz del Olmo |
| 2012/0067825 | A1 | 3/2012 | Pique et al. |

* cited by examiner

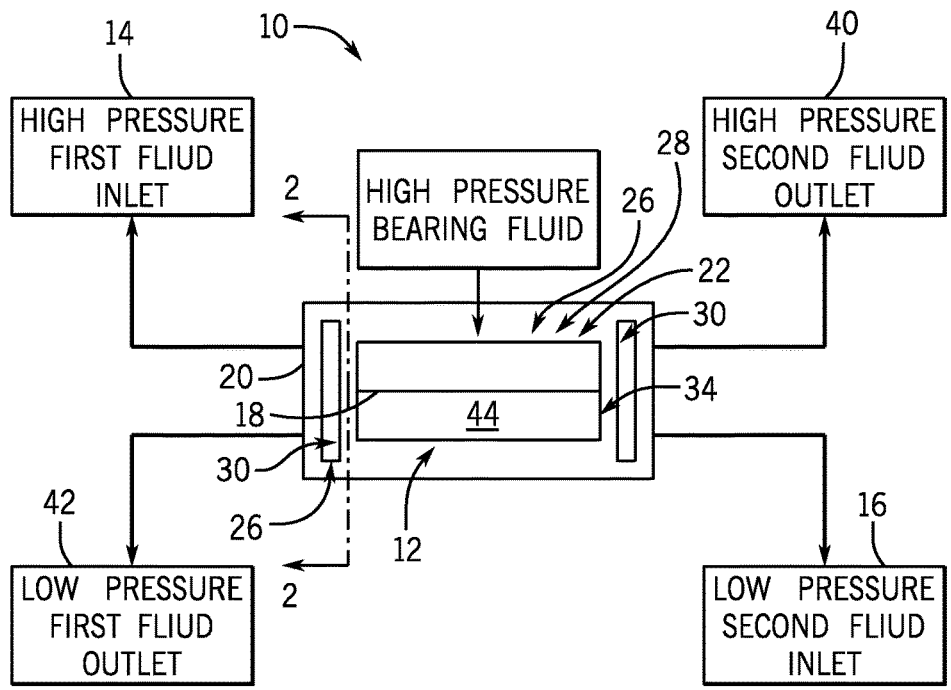
FIG. 1
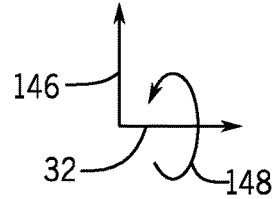
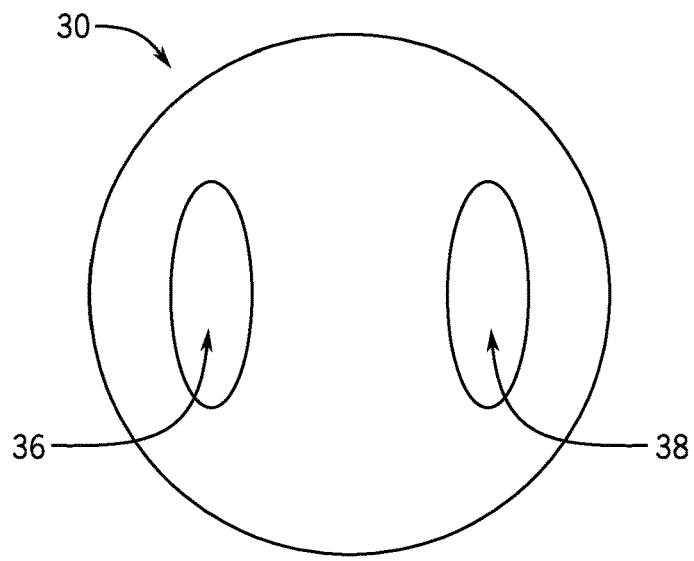
FIG. 2

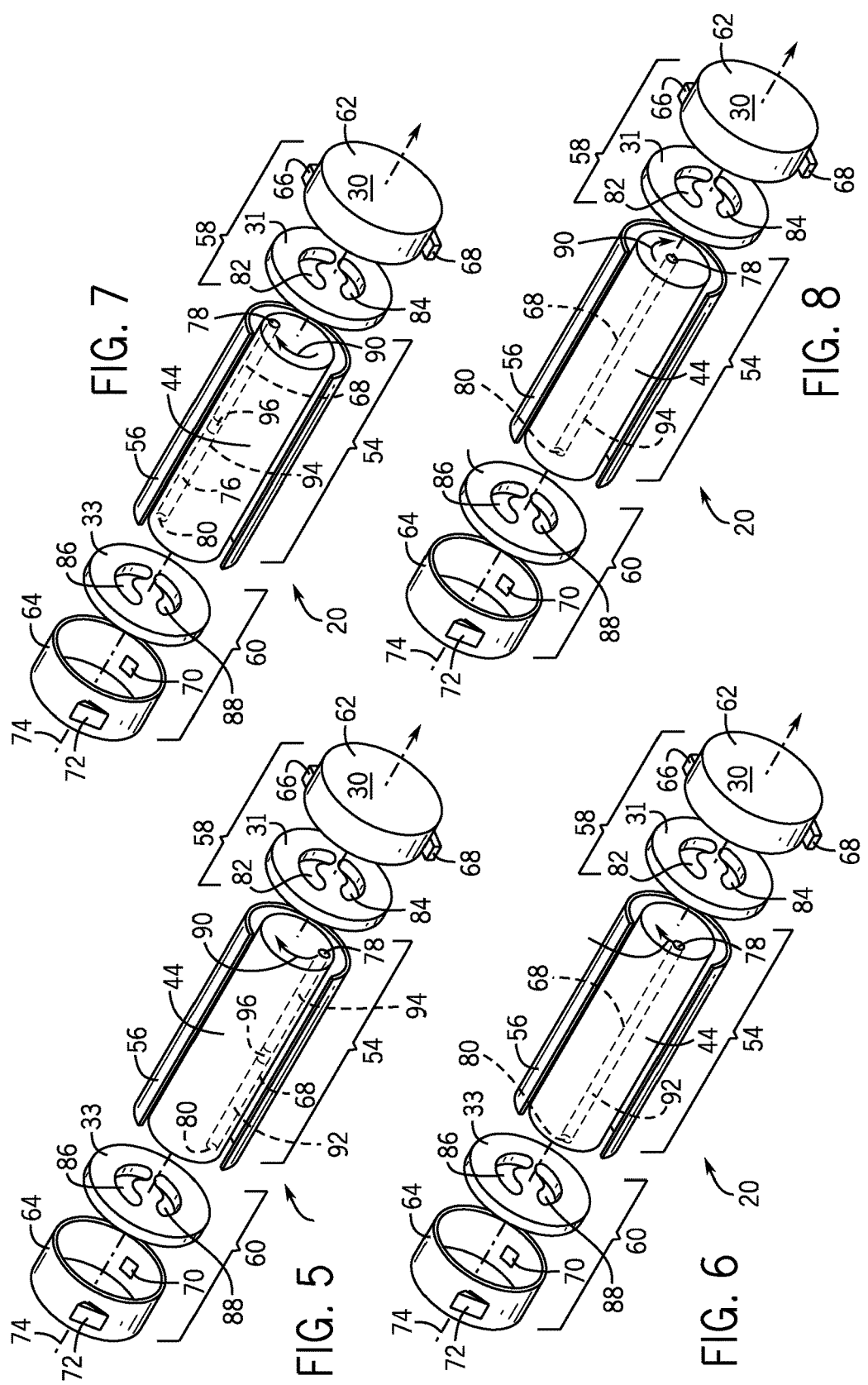

SYSTEM AND METHOD FOR HYDROSTATIC BEARINGS

CROSS-REFERENCE TO RELATED APPLICATION

This application claims priority to and benefit of U.S. Provisional Patent Application No. 62/081,470, entitled "SYSTEMS AND METHODS FOR AN AXIAL HYDROSTATIC BEARING," filed on Nov. 18, 2014, and U.S. Provisional Patent Application No. 62/088,333, entitled "MULTI-POCKET HYDROSTATIC BEARINGS," filed on Dec. 5, 2014, which are hereby incorporated by reference in their entirety for all purposes.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

The subject matter disclosed herein relates to rotating equipment, and, more particularly, to systems and methods for an axial bearing system for use with rotating equipment.

Rotating equipment, such as pumps, may handle a variety of fluids. In certain applications, axial pressure imbalances (i.e. the difference in average pressure between the two axial faces) may exert a substantial net force on rotating components of the rotating equipment. Axial forces may also arise due to the weight of the rotating components. Various bearings may be used to facilitate the rotation of the rotating components of the equipment. However, in situations that require a high pressure and/or a challenging environment, rotating equipment may require additional or increased bearing capacity and functionality. For example, in some situations, rotating equipment with insufficient bearing capacity may result in axial contact between rotating components and stationary components resulting in stalling, wear, stress, and may reduce the life of the equipment and result in a loss of efficiency. Accordingly, it may be beneficial to provide rotating equipment with features that provide additional bearing capacity, such as, for example, additional load bearing capacity or additional stiffness.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 1 is a schematic diagram of an embodiment of a hydraulic energy transfer system having a hydrostatic bearing system;

FIG. 2 is a cross-sectional diagram of an embodiment of the hydraulic energy transfer system of FIG. 1;

FIG. 5 is an exploded perspective view of an embodiment of a rotary IPX in a first operating position;

FIG. 6 is an exploded perspective view of an embodiment of a rotary IPX in a second operating position;

FIG. 7 is an exploded perspective view of an embodiment of a rotary IPX in a third operating position;

FIG. 8 is an exploded perspective view of an embodiment of a rotary IPX in a fourth operating position;

DETAILED DESCRIPTION OF SPECIFIC EMBODIMENTS

Figure 3:
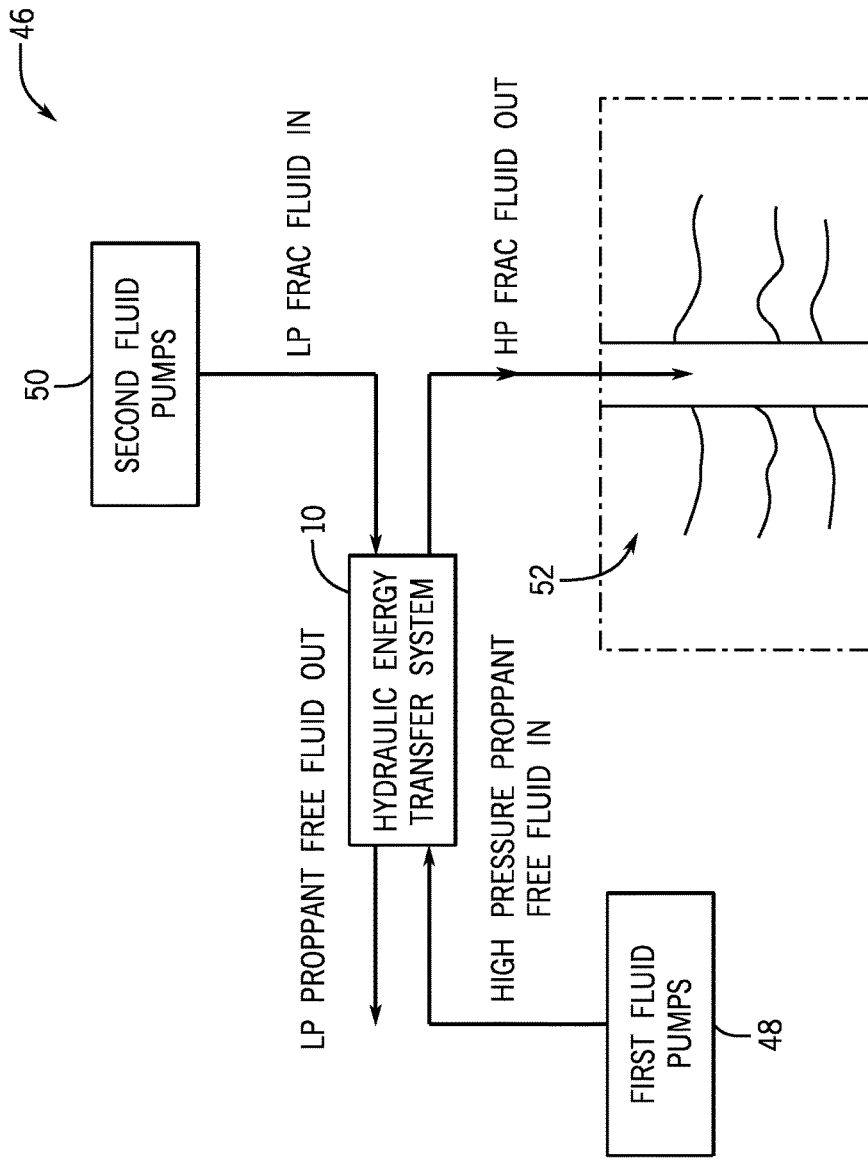
FIG. 3 is a schematic diagram of an embodiment of a frac system with a hydraulic energy transfer system.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in detail below, the embodiments disclosed herein generally relate to systems and methods for rotating systems that may be utilized in various industrial applications. The rotating systems disclosed herein may include a hydrostatic bearing system configured to provide an additional bearing capacity, so that the rotating system provides sufficient load capacity for supporting certain rotating equipment, such as the rotor. Indeed, in certain industrial situations involving high pressures or other challenging applications, the bearing system of the rotating system may have insufficient load capacities or functionalities to support rotating equipment, such as the rotor. Such situations may result in a stalled rotor and/or contact/friction between portions of the bearing system, thereby resulting in a loss of efficiency, wear, stress, and/or a reduced life of the rotating equipment. Accordingly, the embodiments disclosed herein may provide rotating system having a hydrostatic bearing system configured to handle additional bearing or load capacities, which may, for example, provide additional axial load capacities and a greater stiffness for supporting rotating equipment, such as the rotor. Particularly, the hydrostatic bearing system may be utilized within industrial applications having higher pressures and/or more challenging applications, such as, for example, in isobaric pressure exchangers.

In certain embodiments, the rotating system may include a hydraulic energy transfer system that is configured to handle a variety of fluids. Specifically, the hydraulic energy transfer system may transfer work and/or pressure between first and second fluids via a hydrostatic bearing system that may be used to facilitate the rotation of rotating components of the equipment. Generally, hydrostatic bearing systems within the hydraulic energy transfer system may operate with a source of fluid (e.g., high pressure bearing fluid) that is introduced between a rotor and endcovers (e.g., support for the rotor). The high pressure of the fluid source may be configured to support the rotor on a fluid film and may be configured to facilitate the rotation of the rotating components. Particularly, when the rotor moves away from the endcovers, an axial clearance region between the rotor and the endcover may increase. The increase in the axial clearance region allows the high pressure fluid to escape, thereby decreasing the pressure acting on the rotor. Likewise, when the axial clearance region is small between the rotor and the endcover, high pressure fluid builds within the axial bearing region.

The hydrostatic bearing system may include one or more axial clearance openings within the axial bearing region (e.g., the interface between the rotor and the end cover of the hydraulic energy transfer system) that help provide additional bearing capacities and/or axial load capacities for the hydraulic energy transfer system. The axial clearance opening may provide a greater hydrostatic bearing restoring force that results in a stiffer hydrostatic bearing system, which may increase the overall axial bearing capacity of the hydraulic energy transfer system. In certain embodiments, the hydrostatic bearing system may include a low pressure sink connected to the low pressure region of the hydraulic energy transfer system via one or more sink channels.

The hydraulic energy transfer system may include a hydraulic turbocharger or a hydraulic pressure exchange system, such as a rotating isobaric pressure exchanger (IPX). In some embodiments, the pressures of the volumes of first and second fluids may not completely equalize. Thus, in certain embodiments, the IPX may operate isobarically, or the IPX may operate substantially isobarically (e.g., wherein the pressures equalize within approximately +/−1, 2, 3, 4, 5, 6, 7, 8, 9, or 10 percent of each other). In certain embodiments, a first pressure of a first fluid (e.g., pressure exchange fluid, motive fluid, etc.) may be greater than a second pressure of a second fluid (e.g., corrosive fluid). For example, the first pressure may be between approximately 5,000 kPa to 25,000 kPa, 20,000 kPa to 50,000 kPa, 40,000 kPa to 75,000 kPa, 75,000 kPa to 100,000 kPa or greater than the second pressure. Thus, the IPX may be used to transfer pressure from a first fluid (e.g., pressure exchange fluid, motive fluid, etc.) at a higher pressure to a second fluid (e.g., corrosive fluid) at a lower pressure. In particular, during operation, the hydraulic energy transfer system may help block or limit contact between the corrosive fluid and other equipment within the industrial applications (e.g., pumps). By blocking or limiting contact between pumps and the corrosive fluids, the hydraulic energy transfer system increases the life/performance while reducing abrasion/wear of various high pressure pumps within various industrial applications as described in detail below.

FIG. 1 is a schematic diagram of an embodiment of a hydraulic energy transfer system 10. In particular, in the illustrated embodiment, the hydraulic energy transfer system 10 (e.g., a hydraulic turbocharger or IPX) may be configured to transfer energy from a first fluid to a second fluid. Furthermore, in certain embodiments, the hydraulic energy transfer system 10 may include a hydrostatic bearing system 12 configured with features that help provide the hydraulic energy transfer system 10 with additional bearing capacities and/or additional axial load capacities.

In certain embodiments, the hydraulic energy transfer system 10 may be configured with a rotary IPX 20 configured to receive a first fluid and a second fluid. It should be noted that reference to various directions (e.g., axial direction 32, radial direction 142, and circumferential direction 148) may be referred to in the following discussion. In certain embodiments, a high pressure pump may be configured to pump the first fluid to the hydraulic energy transfer system 10 at a high pressure. For example, as illustrated, the first fluid may be provided as a high pressure first fluid inlet 14 to the hydraulic energy transfer system 10. Further, in certain embodiments, a low pressure pump may be configured to pump the second fluid to the hydraulic energy transfer system 10 at a low pressure. For example, as illustrated, the second fluid may be provided as a low pressure second fluid inlet 16 to the hydraulic energy transfer system 10. During operation, the hydraulic energy transfer system 10 may be configured to transfer pressures between the first fluid and the second fluid.

As used herein, the isobaric pressure exchanger (IPX) 20 may be generally defined as a device that transfers fluid pressure between a high pressure inlet stream and a low pressure inlet stream at efficiencies in excess of approximately 50%, 60%, 70%, or 80% without utilizing centrifugal technology. In this context, high pressure refers to pressures greater than the low pressure. The low pressure inlet stream of the IPX 20 may be pressurized and exit the IPX at high pressure (e.g., at a pressure greater than that of the low pressure inlet stream), and the high pressure inlet stream may be depressurized and exit the IPX 20 at low pressure (e.g., at a pressure less than that of the high pressure inlet stream). Additionally, the IPX 20 may operate with the high pressure fluid directly applying a force to pressurize the low pressure fluid, with or without a fluid separator between the fluids. Examples of fluid separators that may be used with the IPX include, but are not limited to, pistons, bladders, diaphragms and the like. In certain embodiments, isobaric pressure exchangers 20 may be rotary devices. Rotary isobaric pressure exchangers (IPXs) 20, such as those manufactured by Energy Recovery, Inc. of San Leandro, Calif., may not have any separate valves, since the effective valving action is accomplished internal to the device via the relative motion of a rotor with respect to end covers, as described in detail below with respect to FIGS. 5-8. Rotary IPXs 20 may be designed to operate with internal pistons to isolate fluids and transfer pressure with relatively little mixing of the inlet fluid streams. Reciprocating IPXs may include a piston moving back and forth in a cylinder for transferring pressure between the fluid streams. Any IPX or plurality of IPXs 20 may be used in the disclosed embodiments, such as, but not limited to, rotary IPXs, reciprocating IPXs, or any combination thereof. In addition, the IPX 20 may be disposed on a skid separate from the other components of a fluid handling system, which may be desirable in situations in which the IPX 20 is added to an existing fluid handling system.

As noted above, in certain embodiments, the hydraulic energy transfer system 10 may include the hydrostatic bearing system 12 configured to help facilitate the rotation of the rotating components within the system, such as the rotor 44. Generally, a high pressure bearing fluid may be introduced in proximity to an axial midplane 18 of the rotor 44, about the circumference where it may circulate toward the axial faces where it facilitates radial and axial load bearing. In particular, the plenum region 22 includes an inner wall of a sleeve 24 of the IPX system 20, an outer wall of the rotor 44 disposed within the IPX system 20, and a gap 26 between the sleeve 24 and the rotor 44. In certain embodiments, the plenum region 22 includes an axial bearing region 28, which may be the gap 26 between the rotor 44 and the endcovers 30. The high pressure bearing fluid introduced into the plenum region 22 may be configured to support the rotor 44 on a fluid film and may be configured to facilitate the rotation of the rotor 44. Particularly, when the rotor 44 moves axially 32 away from the endcover 30 due to forces caused by the high pressure bearing fluid, an axial clearance region 34 between the rotor 44 and the endcover 30 may increase. The increase in the axial clearance region 34 allows the high pressure fluid to escape, thereby decreasing a net force acting on the rotor 44 and reducing the axial clearance region 34 to the lesser amount. Likewise, when the axial clearance region 34 is small between the rotor 44 and the endcover 30, high pressure fluid builds within the axial bearing region 28 resulting in a restoring force that increases the axial clearance region 34. In this manner, components of the hydrostatic bearing may work in tandem to create a stiff rotor that resists axial displacement and facilities the steady rotation of the rotor 44. In certain embodiments, the hydrostatic bearing system 12 may include additional features that provide the IPX system 20 with additional load bearing capacities, such as an additional axial load capacity, as further described with respect to FIGS. 12 and 20-22.

FIG. 2 is a cross-sectional diagram taken along the line 2-2 of the hydraulic energy transfer system 10 of FIG. 1. Specifically, the illustrated embodiment depicts a high pressure region 36 and a low pressure region 38 of the hydraulic energy transfer system 10 along the axial clearance region 34 with respect to the axial surface of the endcover 30. For example, the high pressure region 36 along the axial clearance region 34 may be proximate to the high pressure first fluid inlet 14 and a high pressure second fluid outlet 40. Further, the low pressure region 38 along the axial clearance region 34 may be proximate to a low pressure first fluid outlet 42 and the low pressure second fluid inlet 16. Accordingly, the low pressure region 38 of the hydrostatic bearing system 12 may be, in certain embodiments, concentrated proximate to the low pressure first fluid outlet 42 and the low pressure second fluid inlet 16 along the axial clearance region 34. In some embodiments, the hydraulic energy transfer system 10 may be used with a frac system to capture and recycle otherwise wasted pressure energy in fluid flows, as discussed further with respect to FIG. 3.

FIG. 3 is a schematic diagram of an embodiment of a frac system 46 (e.g., fluid handling system) that may be used with the hydraulic energy transfer system 10. In operation, the frac system 46 enables well completion operations to increase the release of oil and gas in rock formations. The frac system 46 may include one or more first fluid pumps 48 and one or more second fluid pumps 50 coupled to a hydraulic energy transfer system 10. As described above, the hydraulic energy system 10 may include a hydraulic turbocharger, rotary IPX, reciprocating IPX, or any combination thereof. In addition, the hydraulic energy transfer system 10 may be disposed on a skid separate from the other components of a frac system 46, which may be desirable in situations in which the hydraulic energy transfer system 10 is added to an existing frac system 46. In operation, the hydraulic energy transfer system 10 transfers pressures without any substantial mixing between a first fluid (e.g., proppant free fluid) pumped by the first fluid pumps 48 and a second fluid (e.g., proppant containing fluid or frac fluid) pumped by the second fluid pumps 50. In this manner, the hydraulic energy transfer system 10 blocks or limits wear on the first fluid pumps 48 (e.g., high-pressure pumps), while enabling the frac system 46 to pump a high-pressure frac fluid into the well 52 to release oil and gas. In addition, because the hydraulic energy transfer system 10 is configured to be exposed to the first and second fluids, the hydraulic energy transfer system 10 may be made from materials resistant to corrosive and abrasive substances in either the first and second fluids. For example, the hydraulic energy transfer system 10 may be made out of ceramics (e.g., alumina, cermets, such as carbide, oxide, nitride, or boride hard phases) within a metal matrix (e.g., Co, Cr or Ni or any combination thereof) such as tungsten carbide in a matrix of CoCr, Ni, NiCr or Co.

Figure 4:
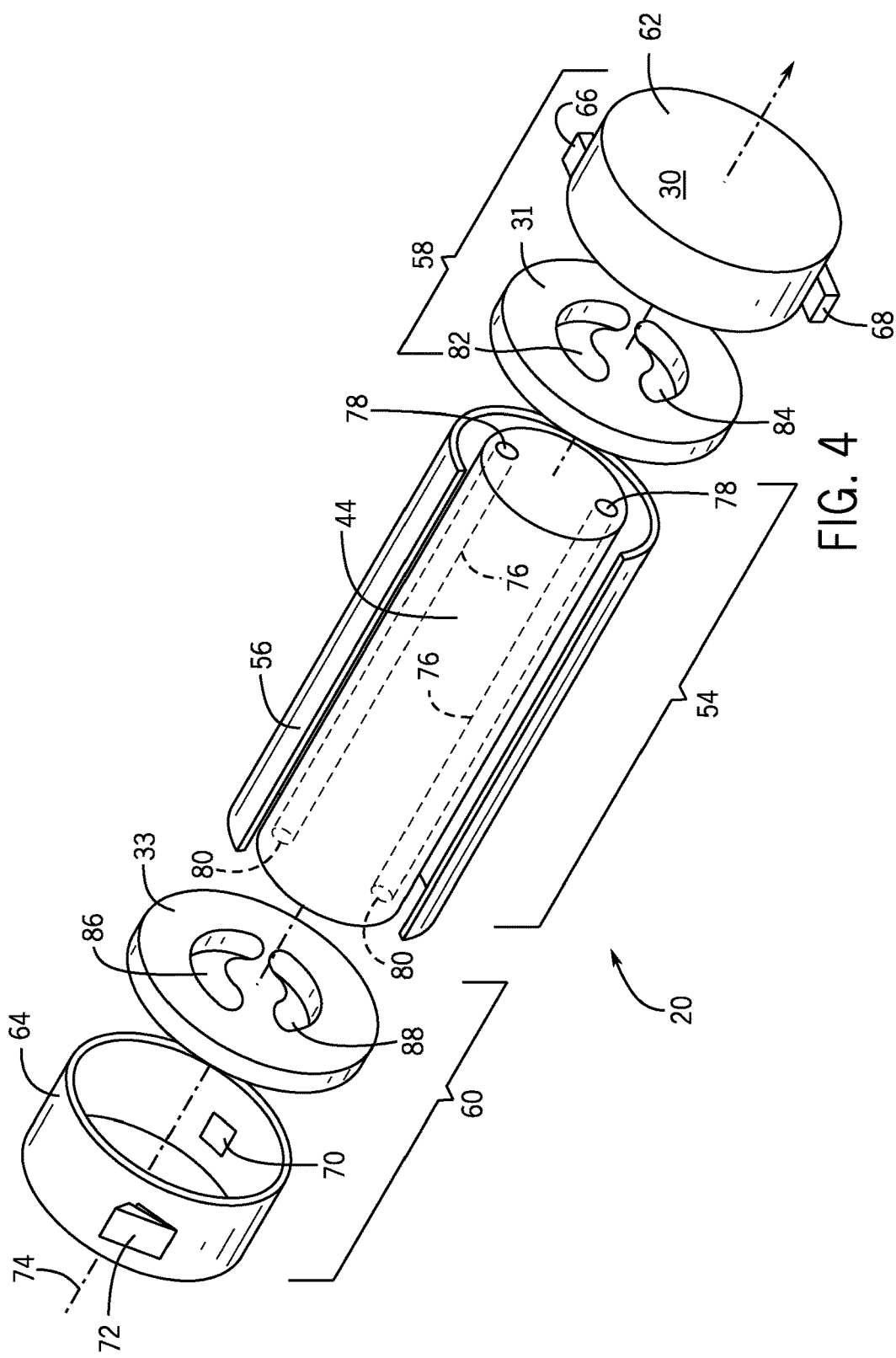
FIG. 4 is an exploded perspective view of an embodiment of the hydraulic energy transfer system of FIG. 1, illustrated as a rotary isobaric pressure exchanger (IPX) system.

Returning now to the hydraulic energy transfer system 10 of FIG. 1, the IPX system 20 may be further understood in the discussion with respect to FIGS. 4-8. FIG. 4 is an exploded view of an embodiment of the rotary IPX 20. In the illustrated embodiment, the rotary IPX 20 may include a generally cylindrical body portion 54 that includes a housing 56 and the rotor 44. The rotary IPX 20 may also include two end structures 58 and 60 that include manifolds 62 and 64, respectively. Manifold 62 includes inlet and outlet ports 66 and 68 and manifold 64 includes inlet and outlet ports 70 and 72. For example, inlet port 66 may receive a high pressure first fluid and the outlet port 68 may be used to route a low pressure first fluid away from the IPX 20. Similarly, inlet port 70 may receive a low pressure second fluid and the outlet port 72 may be used to route a high pressure second fluid away from the IPX 20. The end structures 58 and 60 include generally flat end plates 31, 33 (e.g., endcovers 30), respectively, disposed within the manifolds 62 and 64, respectively, and adapted for fluid sealing contact with the rotor 44. The rotor 44 may be cylindrical and disposed in the housing 56, and is arranged for rotation about a longitudinal axis 74 of the rotor 44. The rotor 44 may have a plurality of channels 76 extending substantially longitudinally through the rotor 44 with openings 78 and 80 at each end arranged symmetrically about the longitudinal axis 74. The openings 78 and 80 of the rotor 44 are arranged for hydraulic communication with the end plates 62 and 64, and inlet and outlet apertures 82 and 84, and 86 and 88, in such a manner that during rotation they alternately hydraulically expose fluid at high pressure and fluid at low pressure to the respective manifolds 62 and 64. The inlet and outlet ports 66, 68, 70, and 72, of the manifolds 62 and 64 form at least one pair of ports for high pressure fluid in one end element 58 or 60, and at least one pair of ports for low pressure fluid in the opposite end element, 58 or 60. The end plates 62 and 64, and inlet and outlet apertures 82 and 84, and 86 and 88 are designed with perpendicular flow cross sections in the form of arcs or segments of a circle.

With respect to the IPX 20, the plant operator has control over the extent of mixing between the first and second fluids, which may be used to improve the operability of the fluid handling system. For example, varying the proportions of the first and second fluids entering the IPX 20 allows the plant operator to control the amount of fluid mixing within the fluid handling system. In certain embodiments, the proportion of the motive fluid may be varied with respect to the corrosive fluid to control the amount of mixing within the fluid handling system, as further described with respect to FIG. 12. Three characteristics of the IPX 20 that affect mixing are: (1) the aspect ratio of the rotor channels 76, (2) the short duration of exposure between the first and second fluids, and (3) the creation or presence of a fluid barrier (e.g., an interface) between the first and second fluids within the rotor channels 76. First, the rotor channels 76 are generally long and narrow, which stabilizes the flow within the IPX 20. In addition, the first and second fluids may move through the channels 76 in a plug flow regime with very little axial mixing. Second, in certain embodiments, at a rotor speed of approximately 1200 RPM, the time of contact between the first and second fluids may be less than approximately 0.15 seconds, 0.10 seconds, or 0.05 seconds, which again limits mixing of the streams. Third, a small portion of the rotor channel 76 is used for the exchange of pressure between the first and second fluids. Therefore, a volume of fluid remains in the channel 76 as a barrier between the first and second fluids. All these mechanisms may limit mixing within the IPX 20.

FIGS. 5-8 are exploded views of an embodiment of the rotary IPX 20 illustrating the sequence of positions of a single channel 76 in the rotor 44 as the channel 76 rotates through a complete cycle, and are useful to an understanding of the rotary IPX 20. It is noted that FIGS. 5-8 are simplifications of the rotary IPX 20 showing one channel 76 and the channel 76 is shown as having a circular cross-sectional shape. In other embodiments, the rotary IPX 20 may include a plurality of channels 76 (e.g., 2 to 100) with different cross-sectional shapes. Thus, FIGS. 5-8 are simplifications for purposes of illustration, and other embodiments of the rotary IPX 20 may have configurations different from that shown in FIGS. 5-8. As described in detail below, the rotary IPX 20 facilitates a hydraulic exchange of pressure between two liquids by putting them in momentary contact within a rotating chamber. In certain embodiments, this exchange happens at a high speed that results in very high efficiency with very little mixing of the liquids.

In FIG. 5, the channel opening 78 is in hydraulic communication with aperture 84 in endplate 31 and therefore with the manifold 62 at a first rotational position of the rotor 44 and opposite channel opening 80 is in hydraulic communication with the aperture 88 in endplate 33, and thus, in hydraulic communication with manifold 64. As discussed below, the rotor 44 rotates in the clockwise direction indicated by arrow 90. As shown in FIG. 5, low pressure second fluid 92 passes through end plate 31 and enters the channel 76, where it pushes first fluid 94 out of the channel 76 and through end plate 31, thus exiting the rotary IPX 20. In certain embodiments, the first and second fluids 92 and 94 contact one another at an interface 96 where minimal mixing of the liquids occurs because of the short duration of contact. In certain embodiments, the interface 96 may be a direct contact interface because the second fluid 92 directly contacts the first fluid 94. In other embodiments, the interface 96 may include a dynamic barrier that is utilized to separate the first fluid and the second fluid. In other embodiments, asymmetrical flow of the first and second fluids may result in a certain amount of mixing between the first and second fluids.

In FIG. 6, the channel 76 has rotated clockwise through an arc of approximately 90 degrees, and the outlet 80 is now blocked off between apertures 86 and 88 of end plate 33, and outlet 78 of the channel 76 is located between the apertures 82 and 84 of end plate 31 and, thus, blocked off from hydraulic communication with the manifold 62 of end structure 58. Thus, the low pressure second fluid 92 is contained within the channel 76.

In FIG. 7, the channel 76 has rotated through approximately 180 degrees of arc from the position shown in FIG. 5. Opening 80 is in hydraulic communication with aperture 86 in end plate 33 and in hydraulic communication with manifold 64, and the opening 78 of the channel 76 is in hydraulic communication with aperture 82 of end plate 31 and with manifold 62 of end structure 58. The liquid in channel 76, which was at the pressure of manifold 64 of end structure 60, transfers this pressure to end structure 58 through outlet 78 and aperture 82, and comes to the pressure of manifold 62 of end structure 58. Thus, high pressure first fluid 94 pressurizes and displaces the second fluid 92.

In FIG. 8, the channel 76 has rotated through approximately 270 degrees of arc from the position shown in FIG. 3, and the openings 70 and 72 of channel 68 are between apertures 82 and 84 of end plate 31, and between apertures 86 and 88 of end plate 33. Thus, the high pressure first fluid 94 is contained within the channel 76. When the channel 76 rotates through approximately 360 degrees of arc from the position shown in FIG. 5, the second fluid 92 displaces the first fluid 94, restarting the cycle.

Figure 9:
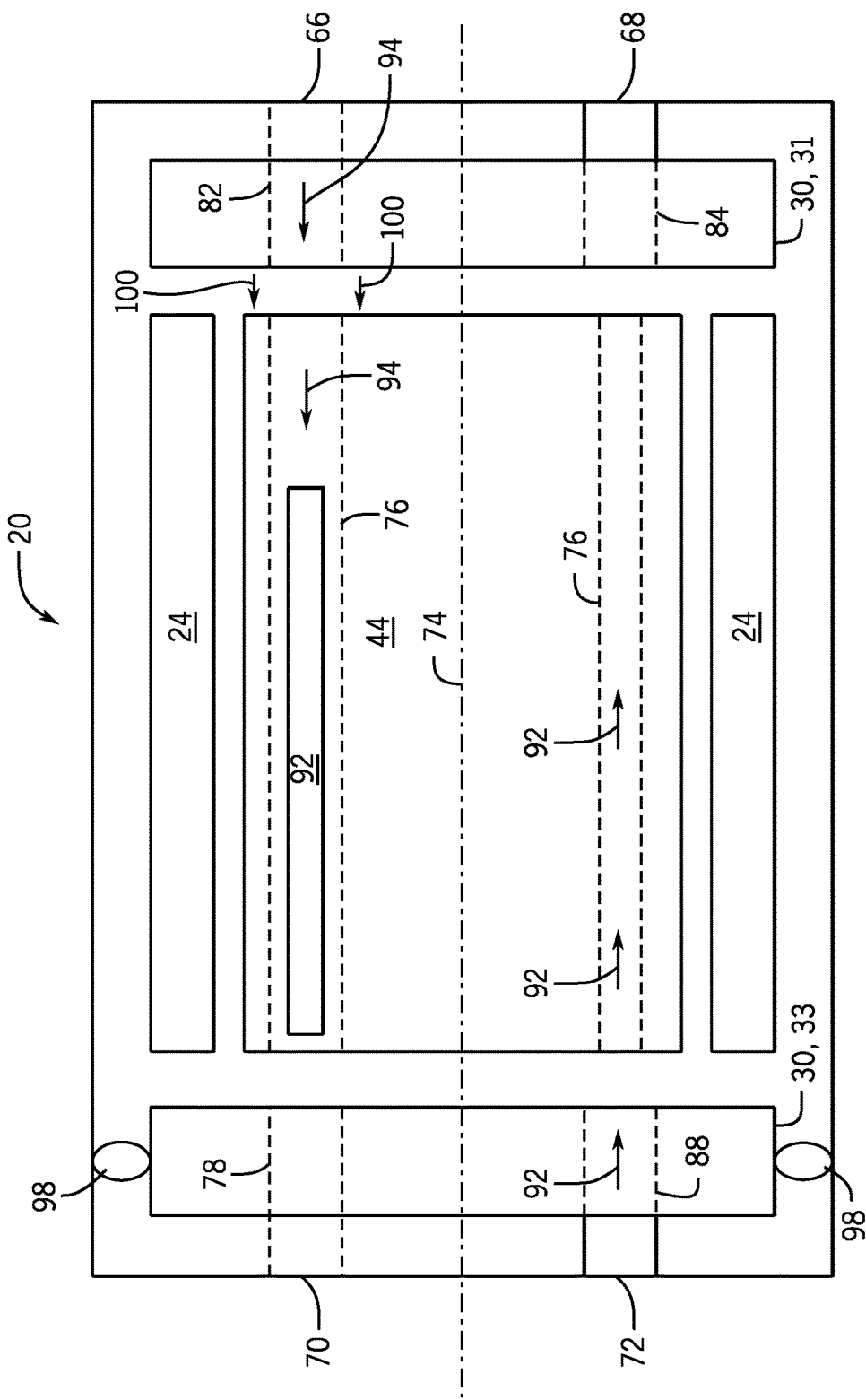
FIG. 9 is a schematic cross-sectional view of a rotary IPX.
Figure 10:
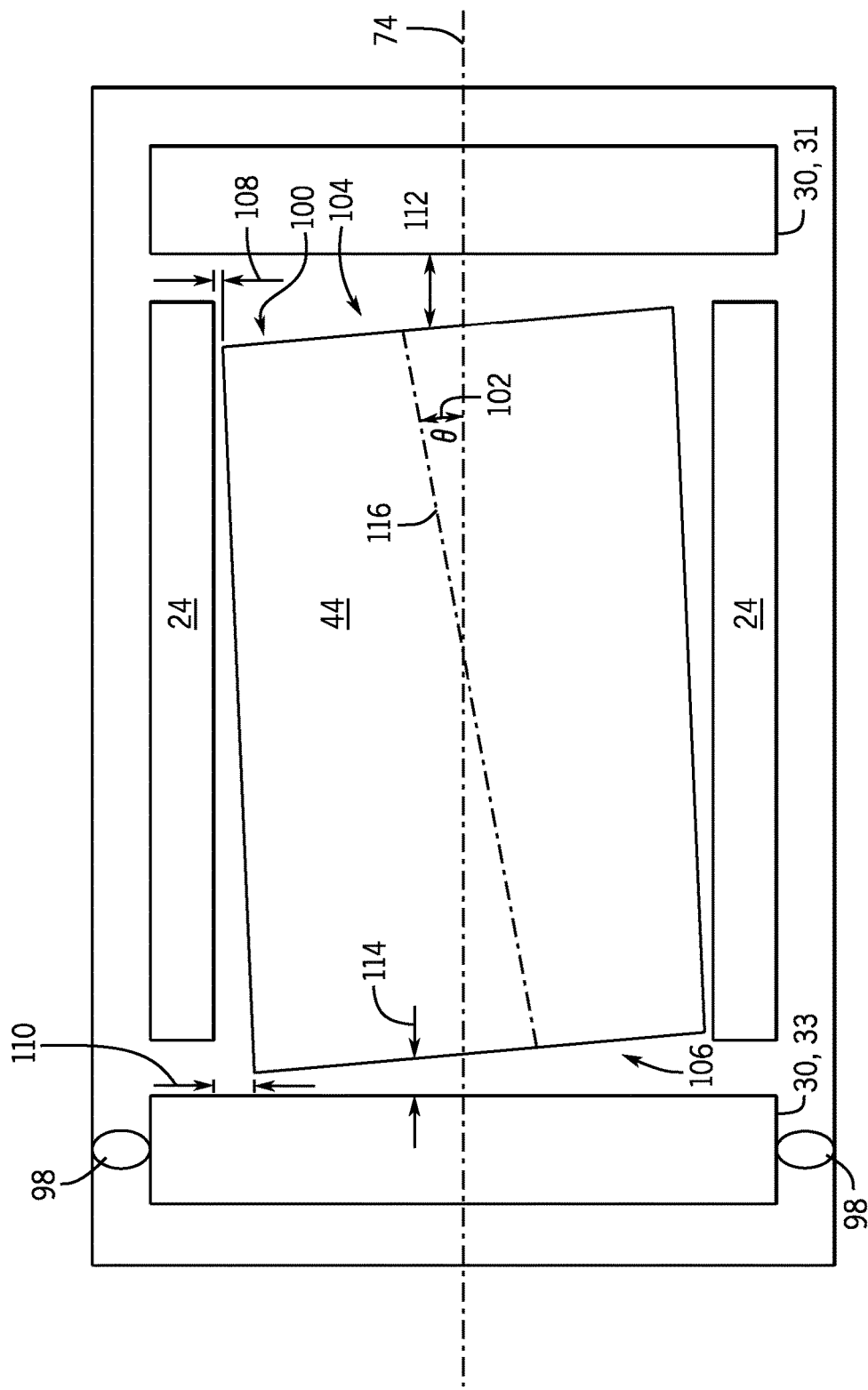
FIG. 10 is a schematic cross-sectional view of a rotary IPX in an unbalanced position.
Figure 11:
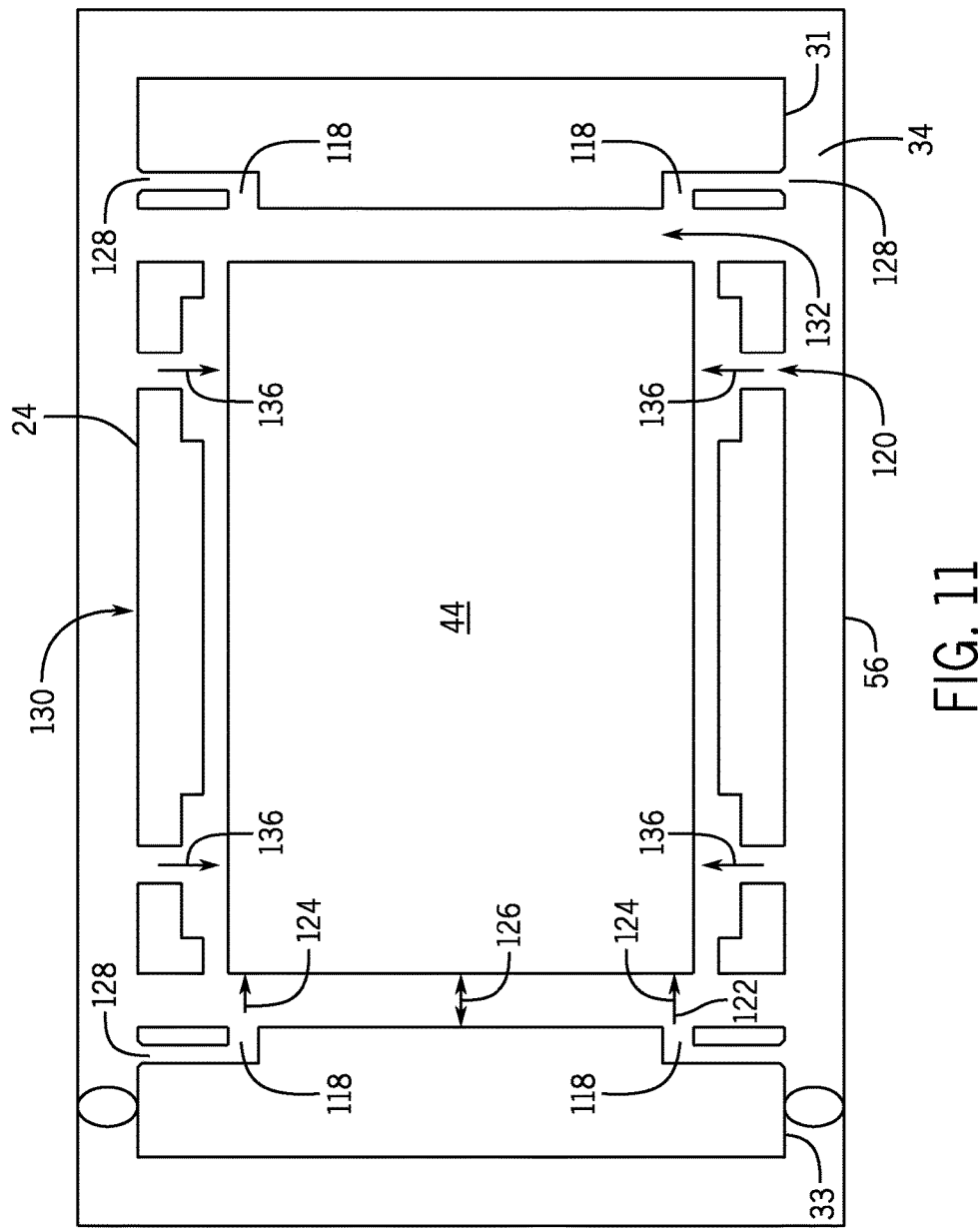
FIG. 11 is a schematic cross-sectional view of a rotary IPX having radial and axial bearings.

The rotary IPX system 20 may be further understood with respect to the discussion of FIGS. 9-11. FIGS. 9-11 depict various cross sectional views of the IPX 20. FIG. 9 is a schematic cross-sectional view of an embodiment of the rotary IPX 20. It will be appreciated that FIG. 9 is a simplified view of the rotatory IPX 20 and certain details have been omitted for clarity. As described above, the rotary IPX 20 includes the housing 56 containing the sleeve 24, the rotor 44, the end covers 31, 33, and a seal 98 among other components. As illustrated, the seal 98 may be disposed between the housing 56 and the end covers 31, 33 to substantially block the flow of the first fluid 94 from exiting the housing 56. However, in the illustrated embodiment, the seal 98 is not positioned about the end cover 31. As discussed above, the HP first fluid 94 may enter the rotary IPX 20 through the inlet 66 and the aperture 82 to drive the LP second fluid 92 out of the channel 76. In certain embodiments, the HP first fluid 94 entering the rotary IPX 20 may transfer a first force 100 to a face of the rotor 20. Additionally, an axial force may also be generated by the LP second fluid 92 entering the rotary IPX 20. For example, as the rotor 20 rotates within the sleeve 24, the HP first fluid 94 may contact solid portions of the rotor 44 between the channels 76. Accordingly, the first force 100 may drive the rotor 44 toward the end cover 186. Moreover, because the first force 100 acts on substantially a top half of the rotor 44, the first force 100 may shift the rotor toward the sleeve 24. That is, the rotor 44 may tilt relative to the axis 74. As a result, the likelihood that the rotor 44 is unbalanced (e.g., an axis of the rotor 44 is not substantially coaxial with the axis 74) during operation increases, thereby potentially increasing the likelihood for friction and wear.

FIG. 10 is a schematic cross-sectional view of an embodiment of the rotor 44 in an unbalanced position as a result of the first force 100. In an unbalanced position, a rotor axis 116 may be positioned at an angle 102, relative to the axis 74; instead of substantially aligned (e.g., coaxial). Accordingly, a first end 104 of the rotor 44 is positioned at a closer distance 108 to the sleeve 24 than a second end 106 of the rotor 44 at a distance 110, relative to the sleeve 24. Moreover, the first force 100 may drive the first end 222 of the rotor 166 a distance 112 from the end cover 31, reducing a distance 114 between the second end 106 and the end cover 33. Accordingly, the likelihood of the rotor 44 contacting the end cover 33 and the sleeve 24 may increase because of the first force 100.

FIG. 11 is a schematic cross-sectional view of rotary IPX 44 having axial and radial bearings 118, 120 (e.g., fluid bearings, hydraulic pressure bearings) configured to maintain the rotary IPX 20 in a balanced position. As used herein, fluid bearings may include fluid dynamic bearings, hydrodynamic bearings, hydrostatic bearings, and the like. Axial bearings 118 are disposed on a face 122 of the end cover 33. In certain embodiments, the axial bearings 118 are configured to apply a force 124 (e.g., a hydraulic force or pressure) to the rotor 44 to drive the rotor 44 away from the end cover 33. That is, the axial bearings 118 are configured to drive the rotor 44 toward the end cover 31, thereby maintaining a clearance 126 between the rotor 44 and end cover 33 and to block contact between the rotor 44 and the end cover 33. As will be described in detail below, in certain embodiments, the axial bearings 118 may be positioned at a variety of locations on the face 122 of the end cover 33 to focus the force 124 at desired locations on the rotor 44. The axial bearings 118 may also balance the rotor 44 (e.g., align the rotor axis 116 with the axis 74 of the rotary IPX 20).

In the illustrated embodiments, the axial bearings 118 are fed the first fluid 94 via flow passages 128 on an outer circumference of the end cover 31, 33. The flow passages 128 receive the HP first fluid 94 disposed outside of the sleeve 24. For example, in certain embodiments, HP first fluid 94 may enter an outer channel 130 via a gap 132 (e.g., axial gap) between the end cover 31 and the rotor 44 or a gap 134 (e.g., radial gap) between the end cap 31 and the housing 56. The outer channel 130 (e.g., axial and/or annular channel) may direct the HP first fluid 94 toward the flow passages 128, thereby enabling the axial bearings 118 to utilize pressure of the HP first fluid 94 to apply a force on the rotor 44 via outlets distributed on an axial face of the end covers 31, 33. The outlets enable the axial bearings 118 to apply the force and/or pressure of the first fluid 94 to the rotor 44. It should be noted that, in other embodiments, the outer channel 130 may receive the HP first fluid 94 via passages in the end cover 31, a flow inlet in the housing 56, or the like.

In some embodiments, the sleeve 24 may also include radial bearings 120 (e.g., fluid bearings). The radial bearings 120 extend through the sleeve 24 and are configured to use the pressure of the first fluid 94 to drive the rotor 44 away from the sleeve 24. Similar to the axial bearings 118, the HP first fluid 94 feeds the radial bearings 120 via the outer channel 130 to utilize the pressure of the HP first fluid 94 to apply a force 136 on the rotor 44. As a result, the radial bearing 120 may align the rotor axis 116 with the axis 74 to block tilting of the rotor 44. Moreover, the first fluid 94 may clean out or purge the axial and radial bearings 118, 120 at the interface between rotating and stationary parts. For example, in the illustrated embodiment, the first fluid 94 is clean or substantially debris-free. As a result, the first fluid 94 may drive particles positioned at the interfaces away, thereby helping to reduce any abrasion, wear, friction, or the like along the interface between the rotating and stationary parts.

Figure 12:
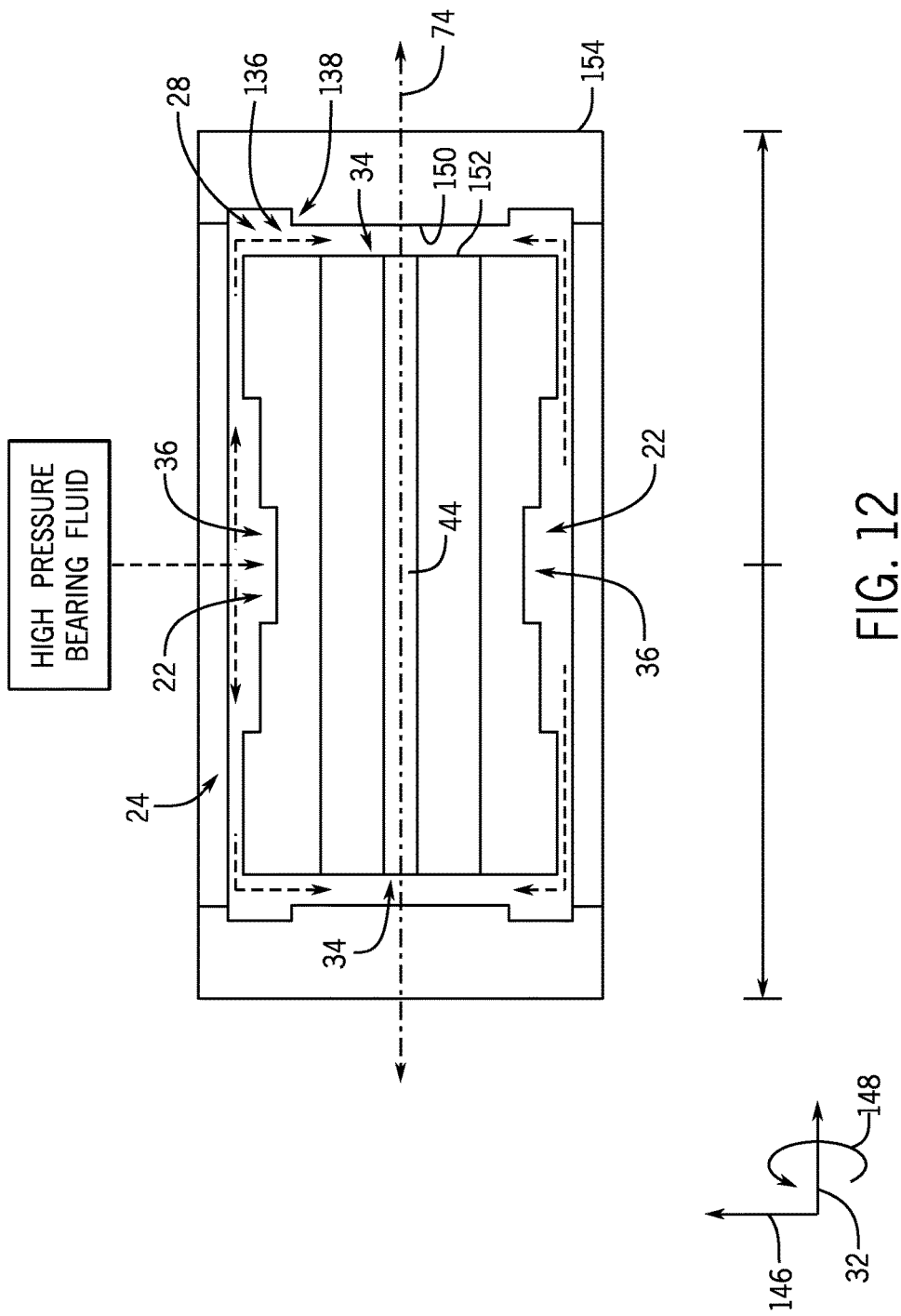
FIG. 12 is a schematic diagram of an embodiment of the hydraulic energy transfer system of FIG. 1, illustrating the hydrostatic bearing system with an endcover notch disposed within the plenum region.

FIG. 12 is a schematic diagram of an embodiment of the hydraulic energy transfer system 10 of FIG. 1, illustrating the hydrostatic bearing system 12 with an axial clearance opening 126 disposed within the axial bearing region 28. Specifically, in the illustrated embodiment, the axial clearance opening 126 may be formed by forming an endcover notch 136 along a portion of the endcover 31, 33, such as along the interface 138 between the rotor 44 and the endcover 31. For example, in certain embodiments, the endcover notch 136 may be disposed on a first surface 150 of the endcover 31, 33 which may be facing and parallel to a second surface 152 of the rotor 44. In certain embodiments, the axial clearance opening 126 and the endcover notch 136 may be configured to spatially increase the axial bearing region 28 of the hydraulic energy transfer system 10, thereby resulting in an increased restoring force that acts on the rotor 44, as further described in detail below. Further, the greater restoring force acting on the rotor 44 may result in a stiffer hydrostatic bearing system, which may help provide a greater axial load capacity for the IPX system 20, as further described below.

In certain embodiments, the interface between the rotor 44 and the endcover 31 may be substantially flat and the first surface 150 of the endcover and a second surface 154 of the endcover may be parallel to each other. In the illustrated embodiment, the axial clearance opening 136 may be formed by forming an endcover notch 136 along a portion of the first surface 150 of the endcover. The axial clearance opening 126 and the endcover notch 136 may be configured to spatially increase the axial clearance region 34 of the IPX system 20. For example, the increased axial clearance region 34 may allow a greater amount of the high pressure bearing fluid to build up, thereby increasing the amount of restoring force of the hydrostatic bearing system 12. As noted above, the restoring force may be configured to increase the axial clearance region 34 or gap between the rotor 44 and the endcover 31, 33. It should be noted that increasing the axial clearance region 34 additionally increases the amount of high pressure close to the high pressure region of the IPX system 20. In this manner, the pressure in the axial clearance region 34 may have more efficacy in providing a restoring force to the rotor 44, which results in a stiffer hydrostatic bearing system 12 that has a higher load capacity.

In certain embodiments, the position and size of the endcover notch 136 may be optimized based on the amount of load capacity or stiffness desired from the hydrostatic bearing system 12. For example, in order to maximize the stiffness of the hydrostatic bearing system 12, the flow resistance from the high pressure region 36 to the axial clearance region 34 should be approximately the same as the flow resistance from the axial clearance region 34 to the low pressure region 38. Further, adjusting the spatial size of the endcover notch 136 may increase an axial clearance opening 140 and may balance these resistances. For example, increasing the size of the endcover notch 136 and the axial clearance opening 140 may decrease the amount of flow resistance between the axial clearance region 34 and the low pressure region 38. Further, increasing the size of the endcover notch 136 and the axial clearance opening 140 may allow a pressure buildup in the axial clearance region 34 that increases the gap 132 between the rotor and the endcover, thereby increasing the restoring force of the hydrostatic bearing system 12. As noted above, increasing the restoring force may provide a stiffer bearing, which may result in a hydrostatic bearing system 12 with additional load bearing features.

It should be noted that in certain embodiments, the endcover notch 136 may be disposed in any location along the interface of the rotor 44 and the endcover 31, 33, and can be configured in a plurality of sizes or shapes. For example, in certain embodiments, a plurality of endcover notches 136 (e.g., 2, 3, 4, 5, 6, 7, 8, or more) may be disposed along the interface between the rotor 44 and the endcover 31, 33. Further, the endcover notches 136 may be configured in a plurality of shapes (e.g., circle, oval, irregular, wavy, etc.). Indeed, as noted above, the physical characteristics of the endcover notches 136 may be determined and optimized based on the amount of load capacity or stiffness desired from the hydrostatic bearing system 12.

Figure 13:
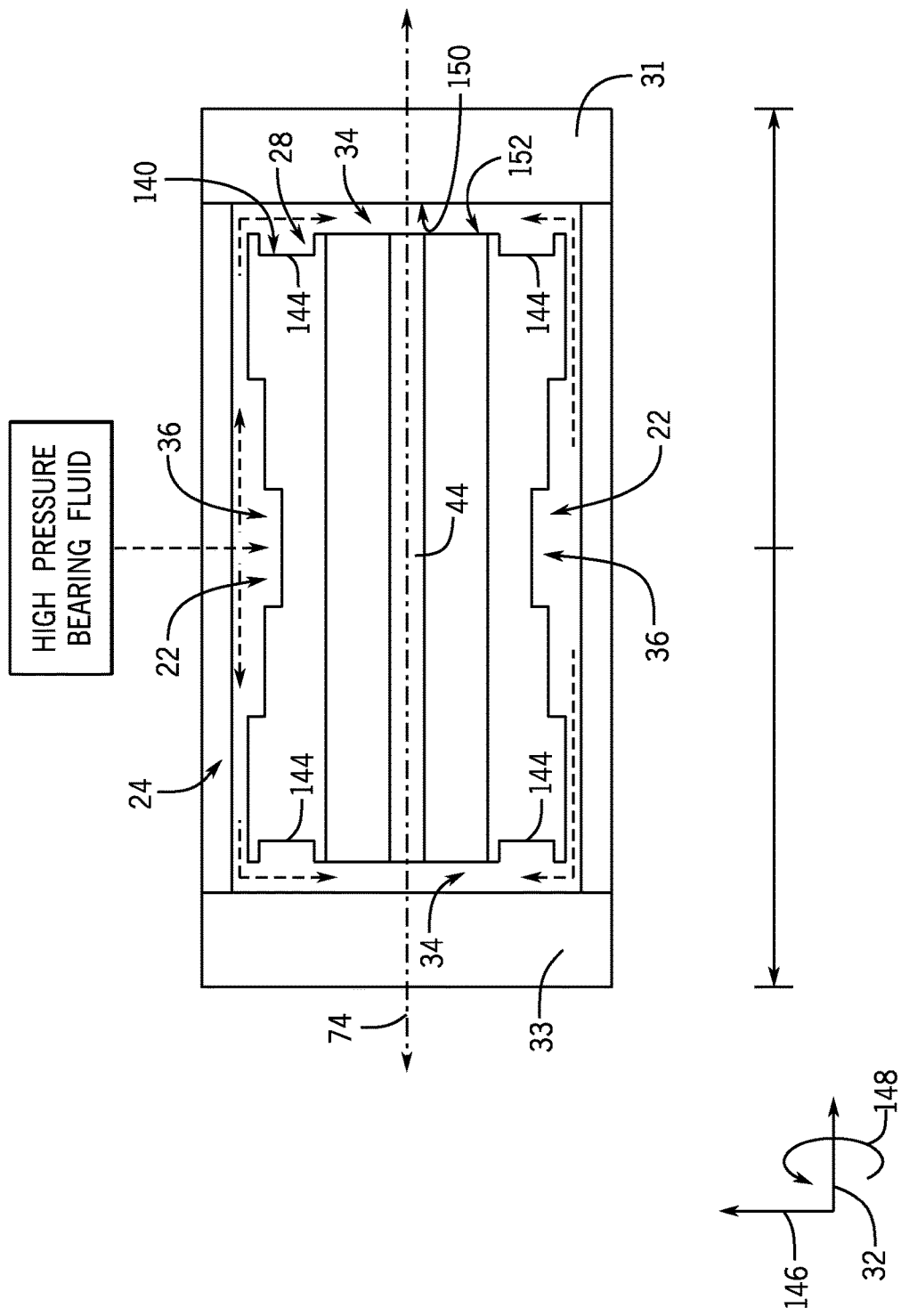
FIG. 13 is a schematic diagram of an embodiment of the hydraulic energy transfer system of FIG. 1, illustrating the hydrostatic bearing system with a rotor notch disposed within the plenum region.

FIG. 13 is a schematic diagram of an embodiment of the hydraulic energy transfer system of FIG. 1, illustrating the hydrostatic bearing system 12 with the rotor notch 144 disposed within the axial bearing region 28. Specifically, in the illustrated embodiment, the axial clearance opening 140 may be formed by forming a rotor notch 144 along a portion of the rotor 44, such as along the interface between the rotor 44 and the endcover 31, 33. The rotor notch 136 and the axial clearance opening 140 may also be configured to spatially increase the axial bearing region 28 of the hydraulic energy transfer system 10, thereby resulting in an increased restoring force. The restoring force acting on the rotor may be configured to increase the axial clearance region 34 or gap between the rotor 44 and the endcover 31, 33. Further, the greater restoring force acting on the rotor 44 may result in a stiffer hydrostatic bearing system, which may help provide a greater axial load capacity for the IPX system 20.

In certain embodiments, similar to the endcover notch 136 described with respect to FIG. 11, the physical characteristics of the rotor notch 144 may be determined and optimized based on the amount of load bearing capacity or stiffness desired from the hydrostatic bearing system 12. Indeed, the rotor notch 144 may be disposed in any location along the second surface of the rotor 44, and can be configured in a plurality of sizes or shapes. For example, in certain embodiments, a plurality of rotor notches (e.g., 2, 3, 4, 5, 6, 7, 8, or more) may be disposed along the interface 138 between the rotor 44 and the endcover 31, 33. Further, the rotor notches 144 may be configured in a plurality of shapes (e.g., circle, oval, irregular, wavy, etc.).

Figure 14:
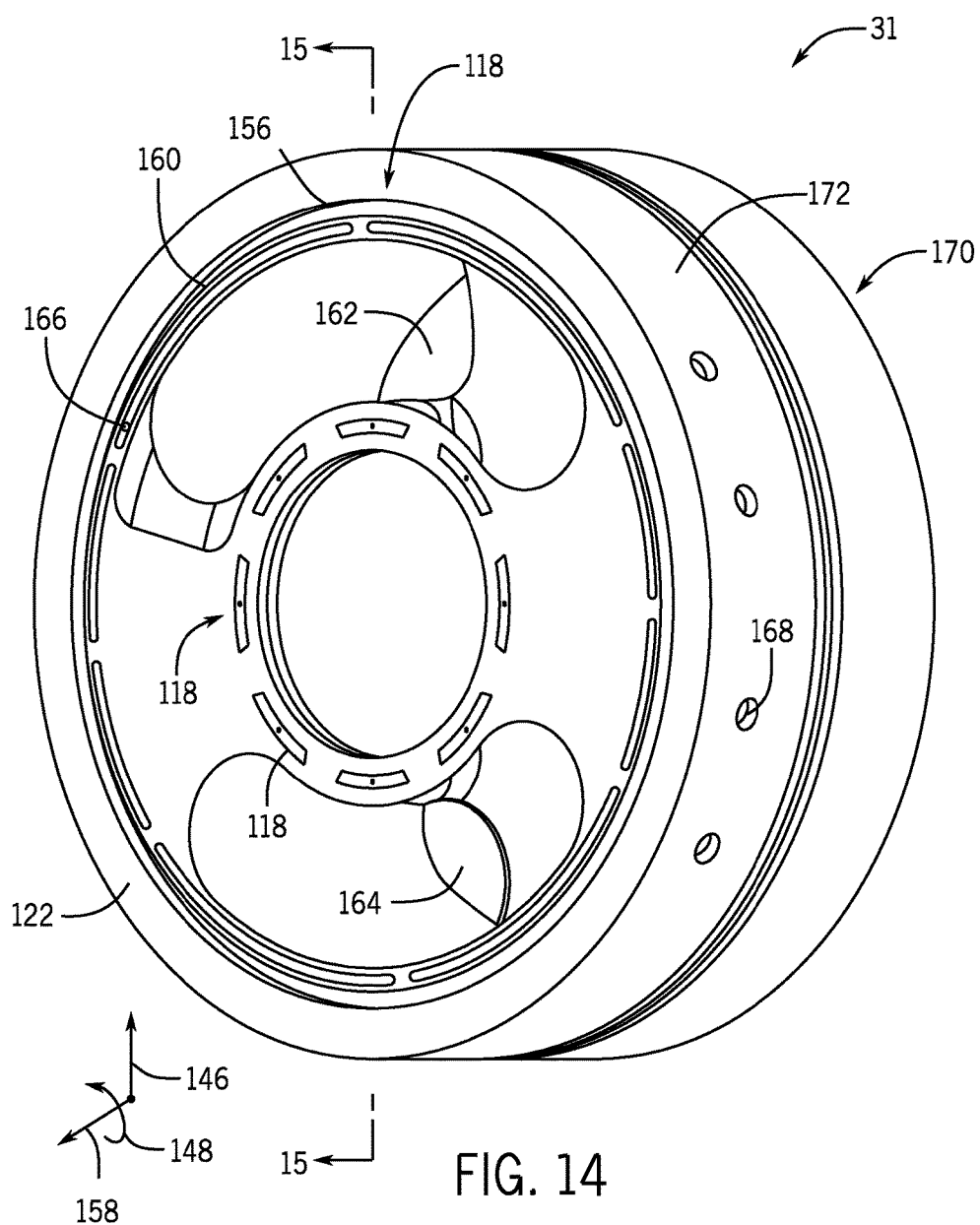
FIG. 14 is a perspective view of an embodiment of an end cover of a rotary IPX having axial bearings.

FIG. 14 is a perspective view of the end cover 31 having the axial bearings 118 distributed over the face 122 adjacent to the rotor 44. The end cover 31 includes an annular groove 156 on the face 122. In certain embodiments, the annular groove 156 is configured to receive the HP first fluid 94 to form a fluidic bearing (e.g., lubricating fluid layer) between the end cover 31 and the rotor 44. The annular groove 156 extends circumferentially about the axis 158 of the face 234 of the end cover 31. Additionally, in other embodiments, the axial bearings 118 may replace the annular groove 156.

In the illustrated embodiment, a first plurality of axial bearings 118 are distributed about the axis 158 of the face 122. The illustrated embodiment includes eight axial bearings 118. However, in other embodiments, 1, 2, 3, 4, 5, 6, 7, 9, 10, or any suitable number of axial bearings 118 may be included. As shown, the axial bearings 118 are radially displaced from the axis 158 along a radial axis 146. In the illustrated embodiment, the axial bearings 118 are radially offset from the annular groove 156. The axial bearings 118 include pockets 160 having a circumferential arc length about the axis 158. In the illustrated embodiment, the axial bearings 118 are substantially equally spaced from one another about a circumferential axis 148, forming a segmented bearing. However, in other embodiments, the axial bearings 118 may not be equally spaced. For example, the spacing between the axial bearings 118 may be smaller in areas to increase the force on the rotor. Additionally, the axial bearings 118 may be joined to form an annular bearing. In the illustrated embodiment, the pockets 160 include a variety of arc lengths (e.g., circumferential extents). Additionally, in the illustrated embodiment, the pockets 160 proximate the inlet apertures 162, 164 are longer (e.g., have a larger circumferential extent) than the pockets 160 radially offset from the apertures 162, 164. However, in other embodiments, the pockets 160 may all have the same arc length. Furthermore, the arc length, the radial extent (e.g., width), the depth, or any other dimension of the pockets 160 may be particularly selected to adjust for the operating conditions of the rotary IPX 20. In some embodiments, the face 122 may include a second plurality of axial bearings 118 radially inset from the first plurality of axial bearings 118. The second plurality may also vary in arc length, radial extent, depth, or any other dimension. As will be appreciated, the location of the axial bearings 118 on the face 122 may be particularly selected based on the operating conditions of the rotary IPX 20.

In operation, the axial bearings 118 are configured to use the pressure of the first fluid 94 to apply a force against the rotor 44 to eliminate and/or substantially reduce the likelihood that the rotor 44 contacts the end cover 31, 33. For example, as the rotor 44 is driven toward the end cover 31, 33 via the first force 100, the localized pressure in the axial bearings 118 increases, thereby generating a force 124 on the rotor 44 that is greater than the force 100 on the rotor 44. As a result, the force produced by the axial bearings 118 maintains the rotor 44 in the balanced position.

In the illustrated embodiment, the axial bearings 118 also include outlets 166 (e.g., axial outlet ports, or openings) disposed within the pockets 160. While the illustrated embodiment includes 1 outlet 166 within the pockets 160, in other embodiments there may be 2, 3, 4, 5, 6, or any suitable number of outlets 166 in the pockets 160. In some embodiments, the outlets 252 are positioned in approximately the center of the pockets 160. However, in other embodiments, the outlets 166 may be positioned in any suitable location in the pockets 160. The outlets 166 are configured to direct the HP first fluid 94 into the pockets 160 from the feedholes 168 (e.g., radial ports or openings) disposed upon an outer circumference 170 of the end cover 31, 33. As shown, the feedholes 168 are positioned upstream of the seal groove 172 (e.g., to enable the HP first fluid 94 to enter the feedholes 168 and supply the HP first fluid 94 to the pockets 168). As will be described above, the flow passages 128 are configured to direct the HP first fluid 94 from the feedholes 168 to the outlets 166, thereby filling the pockets 160 to provide a volume of lubricating fluid.

Figure 15:
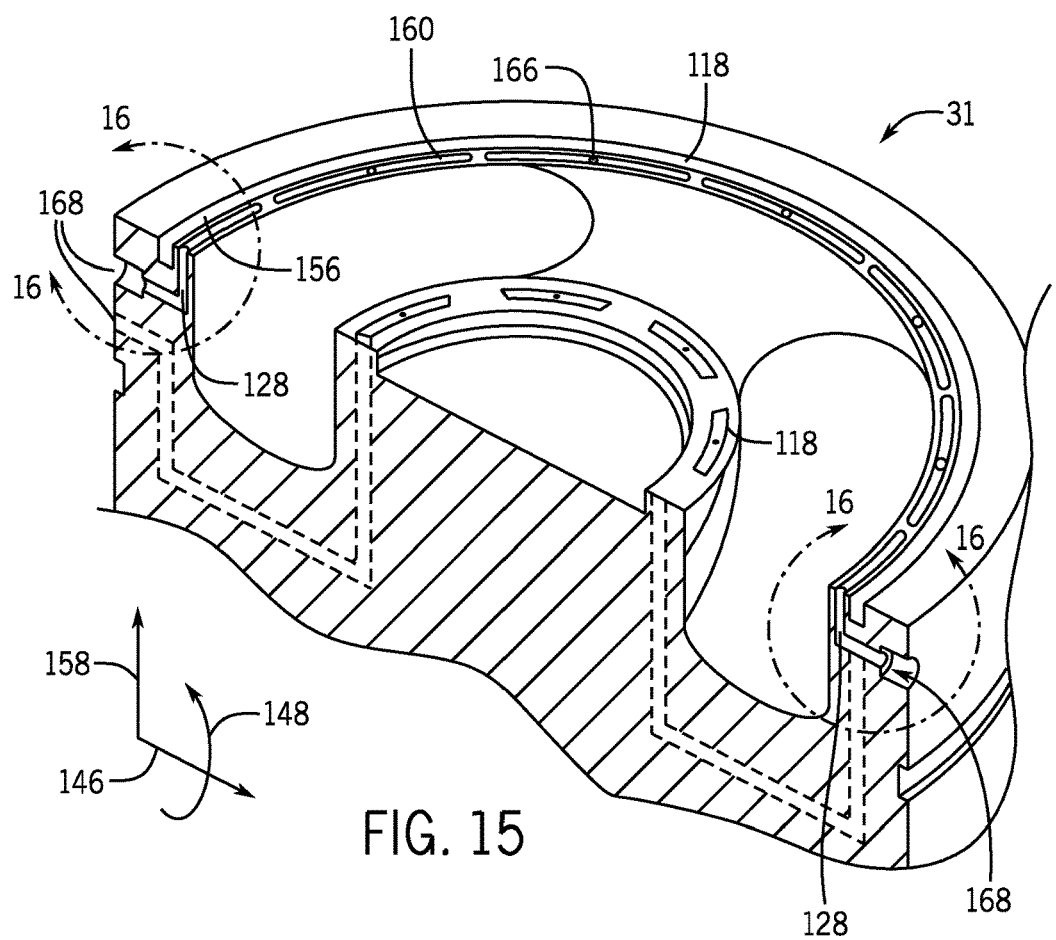
FIG. 15 is a cross-sectional view of an embodiment of the end cover taken along line 15-15 of the rotary IPX of FIG. 14.

FIG. 15 is a cross-sectional view of the end cover 31 taken along the line 15-15. As shown, the feedholes 168 extend radially into the end cover 31, 33 and fluidly couple to the flow passages 128 to direct the HP first fluid 94 toward the outlets 166. In certain embodiments, each outlet 166 is fluidly coupled to single feedhole 168 via the flow passage 128. In other words, in some embodiments, the feedholes 168 are configured to supply the HP first fluid 94 to only one pocket 160. However, in other embodiments, the feedholes 168 may be fluidly coupled to multiple pockets 160 via multiple flow passages 128.

In certain embodiments, the feedholes 168 may include inserts or orifices to modify the inlet flow of the HP first fluid 94. For example, the feedholes 168 may include orifices that cause a pressure drop between the feedholes 168 and the outlets 166. The pressure drop is configured to enable continuous flow of the HP first fluid 94. Additionally, the pressure drop may increase the sensitivity to the pockets 160 to detect small displacements of the rotor 44. Moreover, in other embodiments, the cross-sectional areas of the feedholes 168 and/or the flow passages 128 may vary to modify fluid properties of the HP first fluid 94 as the HP first fluid 94 is directed toward the axial bearings 118.

Figure 16:
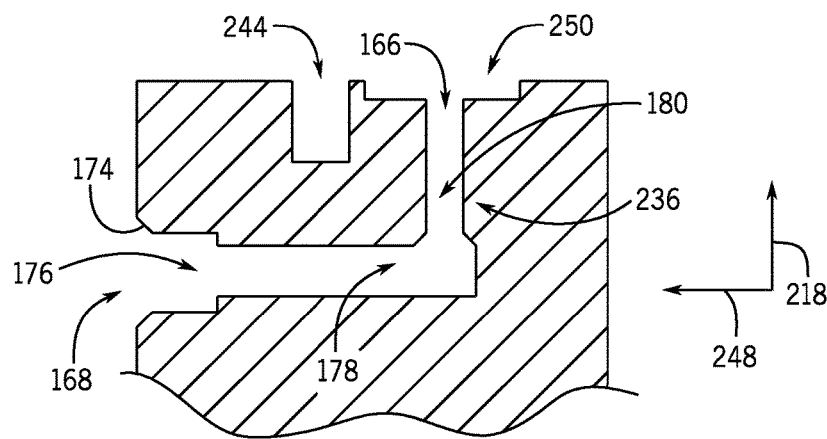
FIG. 16 is a sectional view of an embodiment of the axial bearing of FIG. 14 within line 16-16.

FIG. 16 is a sectional view of the feedhole 168 of the section 16-16 of FIG. 15. As shown, the feedhole 168 is fluidly coupled to the flow passage 128 to direct fluid toward the outlet 166 and into the pocket 160. In the illustrated embodiment, the cross-sectional area of the feedhole 168 is greater than the cross-sectional area of the flow passage 128. That is, the flow passage 128 has a converging geometry. In certain embodiments, the geometry of the flow passage 128 may progressively converge. However, in other embodiments, the geometry of the flow passage 128 may be continuously converging along the flow passage 128. Moreover, the feedhole 168 may include a sloped inlet 174 configured to direct the HP first fluid 94 toward a counter-bored first section 176. Additionally, a second section 178 of the feedhole 168 may have a smaller cross-sectional area than the first section 176 of the feedhole 168. Moreover, a third section 180 of the feedhole 254 may have a smaller cross-sectional area than the second section 178. As a result, properties of the HP first fluid 94 may be adjusted as the first fluid 94 is directed toward the outlet 166. For example, as will be appreciated, adjusting the cross-sectional flow area of the feedhole 168 may cause a drop in pressure from the feedhole 167 to the outlet 166. As mentioned above, the pressure drop enables a continuous flow of the HP first fluid 94 through the feedhole 168. It should be appreciated that while the illustrated embodiment depicts different cross-sectional areas of the first, second, and third sections 176, 178, 180, in other embodiments the cross-sectional areas may be uniform across the first, second, and third sections 176, 178, 180 of the feedhole 168. Furthermore, the cross-sectional areas of the first, second, and third sections 176, 178, 180 of the feedhole 168 may also be adjusted based on operating conditions of the rotary IPX 20.

The size, shape, etc. of the axial bearings 118 may be adjusted depending on the expected operating conditions. For example, the depth of the pockets 160 may be smaller in areas where the distance 114 is expected to the smaller, thereby increasing the force 124 produced by the pockets 160 having the smaller depth. In other embodiments, the end covers 31, 33 a larger number of pockets 160 to increase the force 124 on the rotor 44. Accordingly, the axial bearings 118 may be designed to substantially reduce and/or eliminate the likelihood that the rotor 44 contacts the end cover 31, 33.

Figure 17:
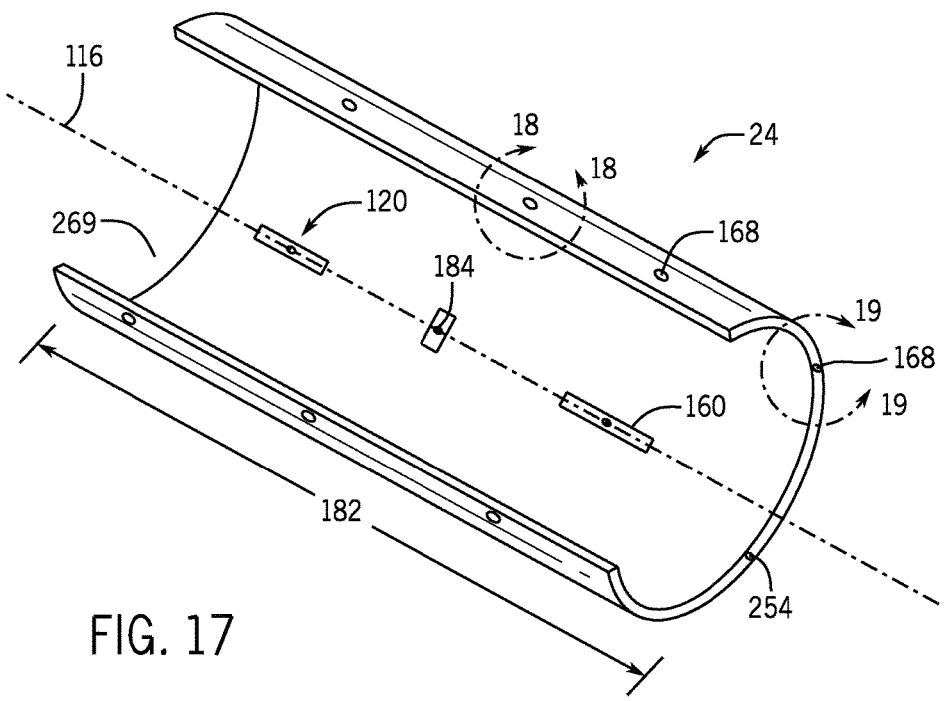
FIG. 17 is a perspective view of a sleeve of the rotary IPX of FIG. 3 having radial bearings.

FIG. 17 is a perspective view of the sleeve 24 having radial bearings 120. As mentioned above, due to the first force 100 acting on the rotor 44, the rotor 44 may tilt, relative to the axis 116. As a result, the first end 104 of the rotor may be a distance 108 from the sleeve 24, thereby increasing the likelihood that the rotor 44 may contact or rub against the sleeve 24. The radial bearings 120 are configured to balance against the force 136 against the rotor 44 to maintain the rotor 44 in the balanced position. As described above, the HP first fluid 94 enters the outer channel 130. The radial bearings 120 are positioned along a length 182 of the sleeve 24 to apply the hydrostatic force along the length of the rotor 44. In certain embodiments, the radial bearings 120 are equally spaced along the length 182. However, in other embodiments, the radial bearings 120 may be positioned on the sleeve 24 based on anticipated deflection of the rotor 44. For example, the radial bearings 120 may be positioned near the first end 104 of the rotor 44 because the first end 104 of the rotor 44 receives direct impact from the first force 100.

As described above with respect to the axial bearings 120, the radial bearings include outlets 184 (e.g., radial ports or openings) fed by the flow passages 128 coupled to the feedholes 168. The outlets 166 direct the first fluid 94 to the pockets 160 to apply the force 136 against the rotor 44. For example, as the distance 108 between the rotor 44 and the sleeve 24 decreases, the area between the rotor 44 and the pocket 160 will also decrease. As a result, the force 136 generated by the radial bearing 120 will increase, thereby driving the rotor 44 away from the sleeve 24. In the illustrated embodiment, the radial bearings 120 are disposed on the interior surface 269 of the sleeve 164. As shown, the radial bearings 120 may be substantially parallel, substantially perpendicular, or form an angle with respect to the axis 116. Moreover, in other embodiments, the radial bearings 120 may be positioned at any reasonable angle relative to the axis 116.

Figure 18:
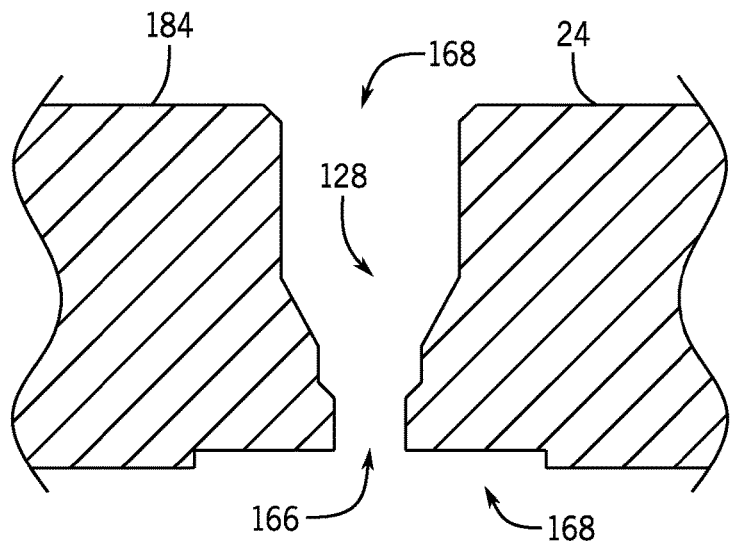
FIG. 18 is a partial cross-sectional view of an embodiment of the radial bearing of FIG. 17 within the line 18-18.

FIG. 18 is a partial cross-sectional view of the area 17-17 of FIG. 17 positioned proximate to the housing 56 and the rotor 44. As shown, the outer channel 130 is configured to supply the first fluid 94 to the feedhole 168. The first feedhole 168 is disposed on an outer surface 184 of the sleeve 24. As described above, the feedhole 168 may include an orifice or insert to restrict or modify the flow of the first fluid 94. The feedhole 168 is fluidly coupled to the flow passage 128 to direct the first fluid 94 toward the pocket 160 via the outlet 166. As shown, the flow passage 128 may include variances in the cross-sectional area through the wall of the sleeve 24. For example, the cross-sectional area may decrease to increase the velocity of the first fluid 94. In other words, the flow passage 128 may have a converging geometry. That is, the geometry of the flow passage 128 may progressively converge along the flow passage 128 or continuously converge along the flow passage 128. Furthermore, the width, depth, shape, or any other dimension of the pocket 160 may be modified based on the operating conditions of the rotary IPX 20. Accordingly, the first fluid 94 is directed to the pocket 160 to apply the hydrostatic force on the rotor 44 to maintain the rotor 44 in the balanced position.

Figure 19:
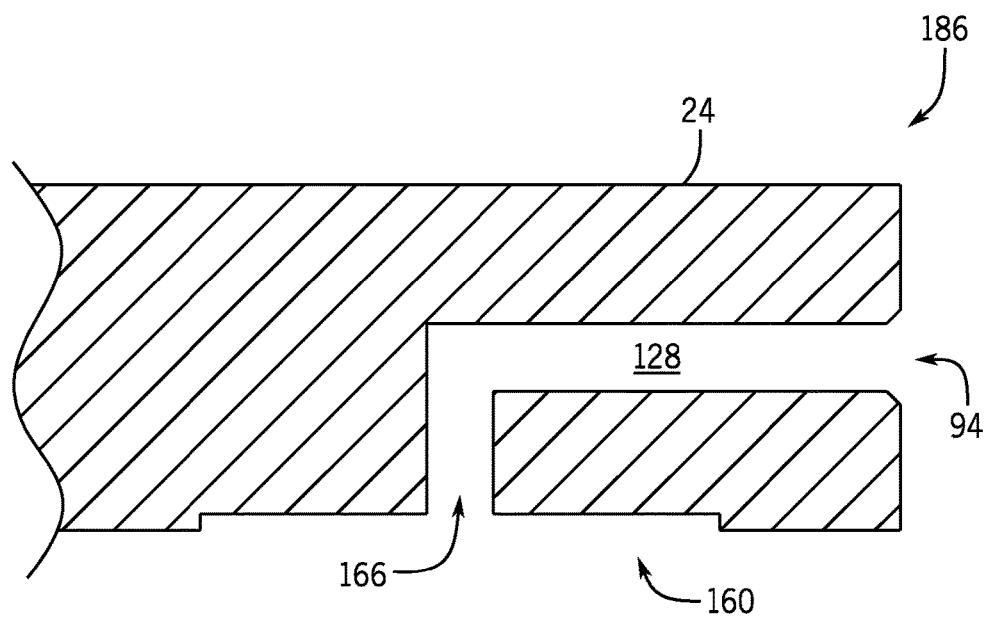
FIG. 19 is a partial cross-sectional view of an embodiment of the radial bearing of FIG. 17 within the line 19-19.

FIG. 19 is a partial cross-sectional view of the area 19-19 of FIG. 17 positioned proximate to the housing 56 and the rotor 44. In the illustrated embodiment, the feedhole 168 is positioned on an axial face 186 of the sleeve 24. Additionally, the first fluid 94 is directed toward the feedhole 168, through the flow passage 128, and into the pocket 160. As mentioned above, the outlet 166 enables the first fluid 94 to enter the pocket 160 and apply the hydrostatic force to the rotor 44. Furthermore, as described in detail above, properties (e.g., cross-sectional area, width, depth, height, length, etc.) of the feedhole 168, the flow passage 128, the outlet 166, and the pocket 160 may be adjusted based on the operating condition of the rotary IPX 20. For example, the flow passage 128 may include variances in the cross-sectional area. In other words, the flow passage 128 may have a converging geometry. That is, the geometry of the flow passage 128 may progressively converge along the flow passage 128 or continuously converge along the flow passage 128. Accordingly, the radial bearings 120 may be configured to apply the hydrostatic pressure against the rotor 44 to maintain the rotor 44 in a balanced position (e.g., the rotor axis 116 aligned with the axis 74 of the rotary IPX 20).

Figure 20:
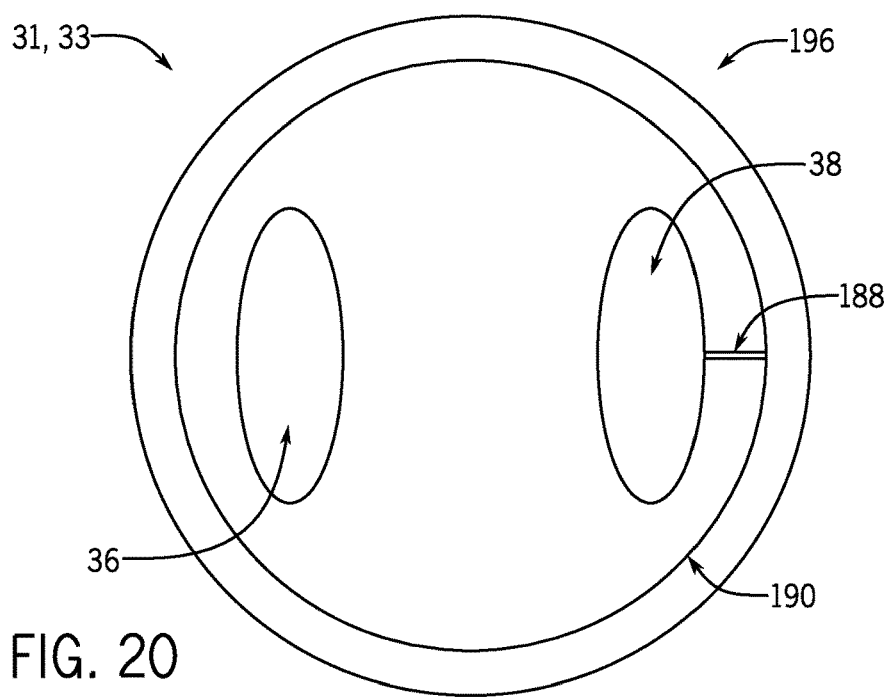
FIG. 20 is a cross-sectional diagram of an embodiment of an endcover of the hydraulic energy transfer system of FIG. 1, illustrating a sink channel and a low pressure sink.

FIG. 20 is a plan view diagram of an embodiment of the endcover 31, 33 of the hydraulic energy transfer system 10 of FIG. 1, illustrating a sink channel 188 and a low pressure sink 190. Specifically, the first surface of the endcover 31, 33 is depicted having the high pressure region 36 and the low pressure region 38. In certain embodiments, a low pressure sink 38 may be provided about the perimeter of the rotor 44 to utilize the perimeter of the rotor 44 within the hydrostatic bearing system 12. Specifically, one or more sink channels 188 may be disposed within the hydrostatic bearing system 12 to connect the low pressure sink 190 with the low pressure region 38. Indeed, the low pressure sink 190 may be configured to mobilize the perimeter of the rotor 44 to engage it within the hydrostatic bearing system 12, as well as help balance the pressure distribution of the IPX system 20. For example, the low pressure sink loop 196 helps balance the pressures of the high pressure region 36 and the low pressure region 38 within the IPX system 20, thereby helping to reduce the impact of the unbalanced pressure distribution on the hydrostatic bearing system 12 and the IPX system 20, and help to provide additional bearing capacities and/or axial load capacities for the IPX 20.

In certain embodiments, the low pressure sink 190 may be connected to the low pressure region 38 via one or more sink channels 188. For example, the sink channels 188 may be formed via a groove 156 disposed in the endcover 31, 33 along the first surface (e.g., the surface facing the rotor) such that it connects the low pressure region 38 to the low pressure sink 190. Further, the sink channels 188 may be configured to act as a drain that routes the high pressure bearing fluid out of the low pressure region 38 of the IPX system 20. Accordingly, in certain embodiments, the high pressure bearing fluid may be configured to travel from the high pressure region 36 to the low pressure region 38 in the radial direction 146, and may be routed from the low pressure region 38 to the low pressure sink 190 through one or more sink channels 188. In this manner, a bearing response is provided proximal to the low pressure region 38 via the low pressure sink 190, thereby improving the hydrostatic bearing performance within the low pressure region 38 and through the IPX system 20.

In the illustrated embodiment, the low pressure sink 190 is provided as the loop 196 about the perimeter of the rotor 44, with the sink channel 188 that connects the low pressure sink 190 to the low pressure region 38 of the IPX system 20. In other embodiments, one or more sink channels 188 may be configured to connect the low pressure sink 190 to the low pressure region 38 of the IPX 20, and the low pressure sink 190 may be a partial loop 198 about the perimeter of the rotor 44, as further described with respect to FIGS. 21 and 22.

Figure 21:
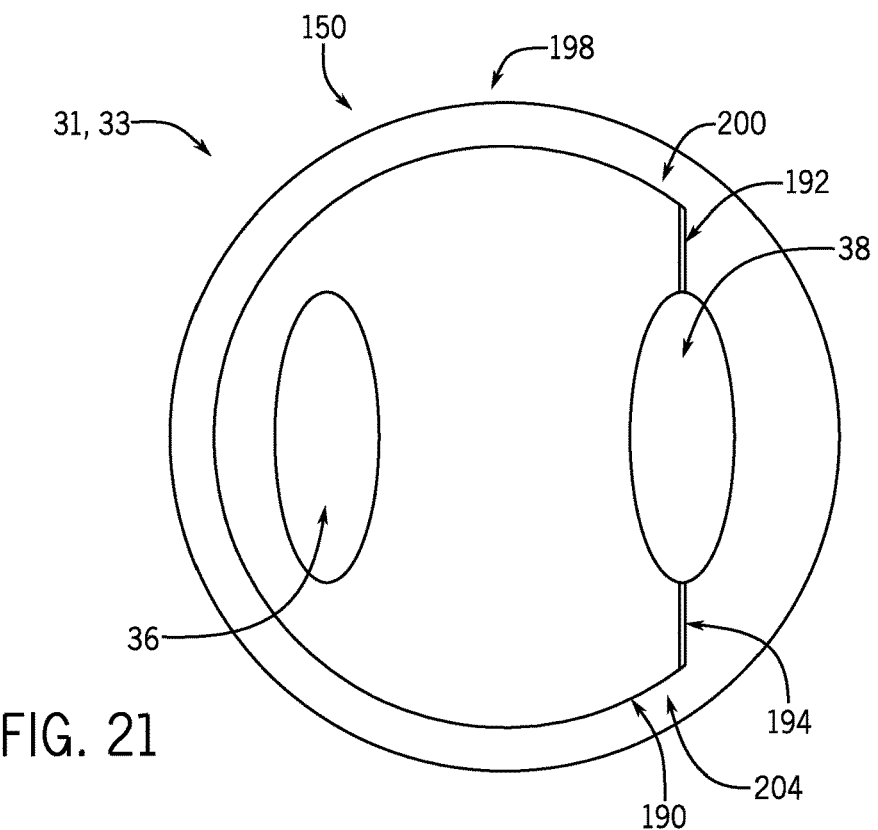
FIG. 21 is a cross-sectional diagram of an embodiment of the endcover of FIG. 20, illustrating a first sink channel, a second sink channel, and a partial low pressure sink loop.

FIG. 21 is a cross-sectional diagram plan view of an embodiment of the endcover 31, 33 of FIG. 20, illustrating a first sink channel 192, a second sink channel 194, and a partial low pressure sink loop 198. In certain embodiments, the first sink channel 192 and the second sink channel 194 may be configured to connect the low pressure sink 190 with the low pressure region 38 of the IPX 20. Specifically, the first sink channel 192 and the second sink channel 194 may be configured as a first groove 200 and a second groove 202 within the first surface 150 of the endcover 31, 33. Particularly, the first groove 200 and the second groove 202 may be configured to form a partial low pressure sink loop 198 around the perimeter of the rotor 44. Indeed, it should be noted that the perimeter of the low pressure sink 190 may be determined and optimized based on the magnitude of bearing capacity desired from the IPX 20. For example, based on the amount of bearing capacity or axial bearing capacity desired from the hydrostatic bearing system 12, the perimeter and the number of sink channels may be determined. Having greater sink capacity will tend to increase leakage which is undesirable, so there may be a tradeoff involved.

Figure 22:
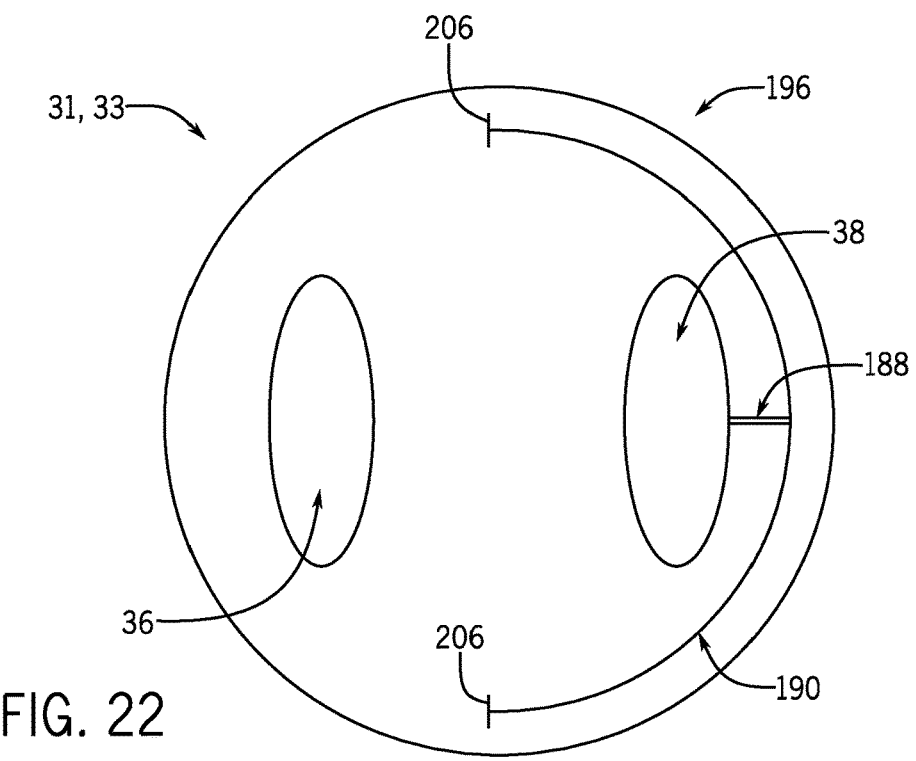
FIG. 22 is a cross-sectional diagram of an embodiment of the endcover of FIG. 20, illustrating the sink channel, a partial low pressure sink, and one or more low pressure sink endpoints.

FIG. 22 is a plan view diagram of an embodiment of the endcover 31, 33 of FIG. 20, illustrating the sink channel 188, a partial low pressure sink 190, and one or more low pressure sink endpoints 206. In certain embodiments, the low pressure sink 190 may be formed as a loop that starts and ends at the low pressure region 38 of the IPX 20. In other embodiments, the low pressure sink 190 may include one or more low pressure sink endpoints 206 configured as a stop point for the low pressure sink loop 196. For example, in the illustrated embodiment, the low pressure sink 190 begins at the low pressure region 38 of the IPX 20 and includes a first and a second low pressure sink endpoint 206 that terminates the loop 196 before it extends across the perimeter of the rotor 44. In this manner, the high pressure bearing fluid that is drained into the low pressure sink 190 may terminate at the endpoints 206 before reversing the flow direction back towards the low pressure region 38.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a hydraulic transfer system configured to exchange pressures between a first fluid and a second fluid, wherein the first fluid has a first pressure and the second fluid has a second pressure, and wherein the first pressure is higher than the second pressure, comprising:
a sleeve;
a cylindrical rotor disposed within the sleeve in a concentric arrangement, wherein the cylindrical rotor is configured to rotate circumferentially about a rotational axis and has a first end face and a second end face disposed opposite each other;
a hydrostatic bearing system configured to utilize a bearing fluid at a pressure higher than the second pressure of the second fluid to resist axial displacement, radial displacement, or both axial and radial displacement of the cylindrical rotor, the hydrostatic bearing system comprises:
a first end cover having a first surface that interfaces with the first end face of the cylindrical rotor, the first surface defines a first groove that extends a first arc length circumferentially about the rotational axis and a second groove that extends a second arc length circumferentially about the rotational axis, the first groove and the second groove are radially offset from each other, wherein the first end cover defines a first aperture that extends radially into the first end cover, wherein the first aperture fluidly couples to the first groove through the first end cover, and wherein an inlet and/or an outlet in the first end cover are radially between the first groove and the second groove and wherein the first groove and the second groove are configured to receive the bearing fluid; and a second end cover having a second surface that interfaces with the second end face of the cylindrical rotor.

2. The system of claim 1, wherein the hydraulic transfer system comprises a rotary isobaric pressure exchanger.

3. The system of claim 1, wherein the hydraulic transfer system comprises a hydraulic turbocharger.

4. The system of claim 1, comprising a frac system having the hydraulic transfer system, wherein the first fluid comprises a proppant free fluid and the second fluid comprises a frac fluid having proppants.

5. The system of claim 1, wherein the hydrostatic bearing system comprises an axial hydrostatic bearing system configured to resist axial displacement of the cylindrical rotor.

6. The system of claim 5, wherein the second surface of the second end cover defines a second groove that extends a second arc length circumferentially about the rotational axis and is configured to receive the bearing fluid to provide a fluidic bearing between the second end cover and the cylindrical rotor.

7. The system of claim 6, wherein the first surface of the first end cover or the second surface of the second end cover comprises at least one additional groove that extends circumferentially at least partially about the rotational axis, and wherein the at least one additional groove comprises an axial hydrostatic bearing, and the at least one additional groove is radially offset from the first groove or the second groove relative to the rotational axis.

8. The system of claim 7, wherein the axial hydrostatic bearing is configured to utilize the first pressure of the first fluid to apply an axial force against the first end face or the second end face to avoid contact between the cylindrical rotor and the first end cover or the second end cover.

9. The system of claim 8, wherein the first end cover or the second end cover comprises an inlet to receive the first fluid, the inlet is fluidly coupled to a first fluid passage disposed within the first end cover or the second end cover, and the at least one additional groove comprises an outlet fluidly coupled to the first fluid passage and disposed within the at least one additional groove, and the outlet is configured to discharge the first fluid from the at least one additional groove to apply the axial force against the first end face or the second end face.

10. The system of claim 1, wherein the hydrostatic bearing system comprises a radial hydrostatic bearing system configured to resist radial displacement of the cylindrical rotor.

11. The system of claim 10, wherein the radial hydrostatic bearing system is configured to apply a radial force to the cylindrical rotor to align the rotational axis of the cylindrical rotor with a central axis of the hydraulic transfer system.

12. The system of claim 10, wherein the radial hydrostatic bearing system comprises at least one radial bearing disposed within the sleeve.

13. The system of claim 12, wherein the at least one radial bearing comprises an inlet disposed on an outer surface of the sleeve configured to receive the first fluid, a first fluid passage fluidly coupled to the inlet, a groove formed on an inner surface of the sleeve, and an outlet disposed within the groove and configured to discharge the first fluid to apply a radial force against an outer lateral surface of the cylindrical rotor.

* * * * *